United States Patent
Tsuchiya

(10) Patent No.: US 10,067,464 B2
(45) Date of Patent: Sep. 4, 2018

(54) OPTICAL SCANNING DEVICE AND IMAGE FORMING APPARATUS INCLUDING THE SAME

(71) Applicant: KYOCERA Document Solutions Inc., Osaka (JP)

(72) Inventor: Hiroaki Tsuchiya, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/695,286

(22) Filed: Sep. 5, 2017

(65) Prior Publication Data
US 2018/0067447 A1  Mar. 8, 2018

(30) Foreign Application Priority Data
Sep. 8, 2016  (JP) .................. 2016-175894

(51) Int. Cl.
```
G03G 21/16      (2006.01)
B41J 2/47       (2006.01)
G02B 26/10      (2006.01)
G03G 15/04      (2006.01)
G03G 15/043     (2006.01)
G02B 26/12      (2006.01)
```

(52) U.S. Cl.
CPC .......... *G03G 21/169* (2013.01); *B41J 2/47* (2013.01); *B41J 2/471* (2013.01); *G02B 26/105* (2013.01); *G02B 26/12* (2013.01); *G03G 15/043* (2013.01); *G03G 15/04036* (2013.01); *H04N 2201/0094* (2013.01)

(58) Field of Classification Search
CPC .................................. G03G 21/169
See application file for complete search history.

(56) References Cited

U.S. PATENT DOCUMENTS

2014/0348529 A1*  11/2014  Takahashi ........ G03G 15/04036
399/71

FOREIGN PATENT DOCUMENTS

JP   2015-199278   11/2015

* cited by examiner

*Primary Examiner* — Clayton E Laballe
*Assistant Examiner* — Jas Sanghera
(74) *Attorney, Agent, or Firm* — Wenderoth, Lind & Ponack, L.L.P.

(57) ABSTRACT

An optical scanning device includes a holding member. The holding member has a boss part and an arm part that extends from the boss part in a direction perpendicular to the movement direction of the holding member and holds the cleaning member. The boss part is mounted with a posture correction member relatively movable in the movement direction of the holding member. The posture correction member is movably inserted into a groove between two second rail parts, and when the holding member moves, the posture correction member moves later than movement of the holding member, so that an inclined posture of the holding member is corrected by the delay operation in a direction perpendicular to the second rail part.

6 Claims, 27 Drawing Sheets

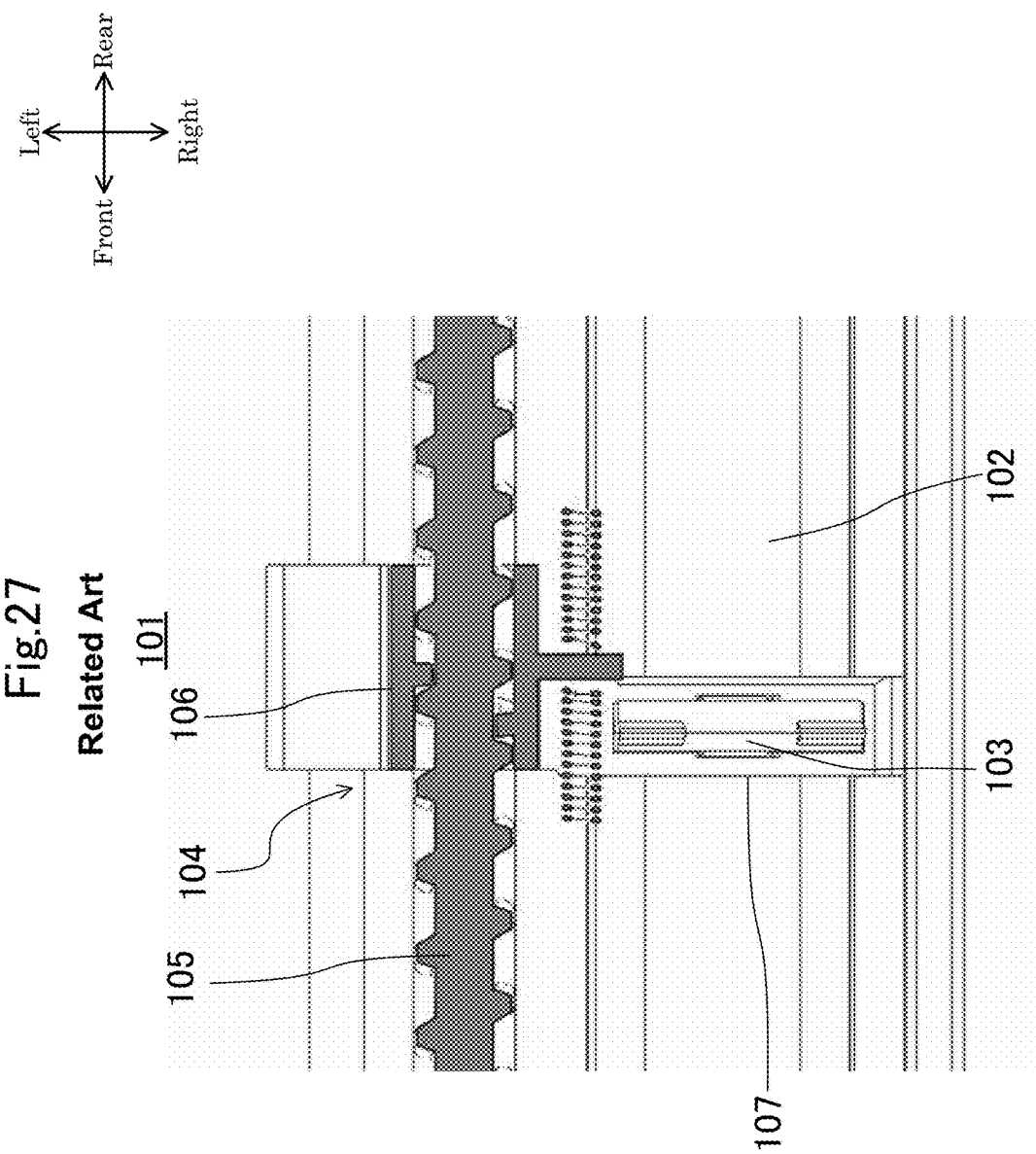

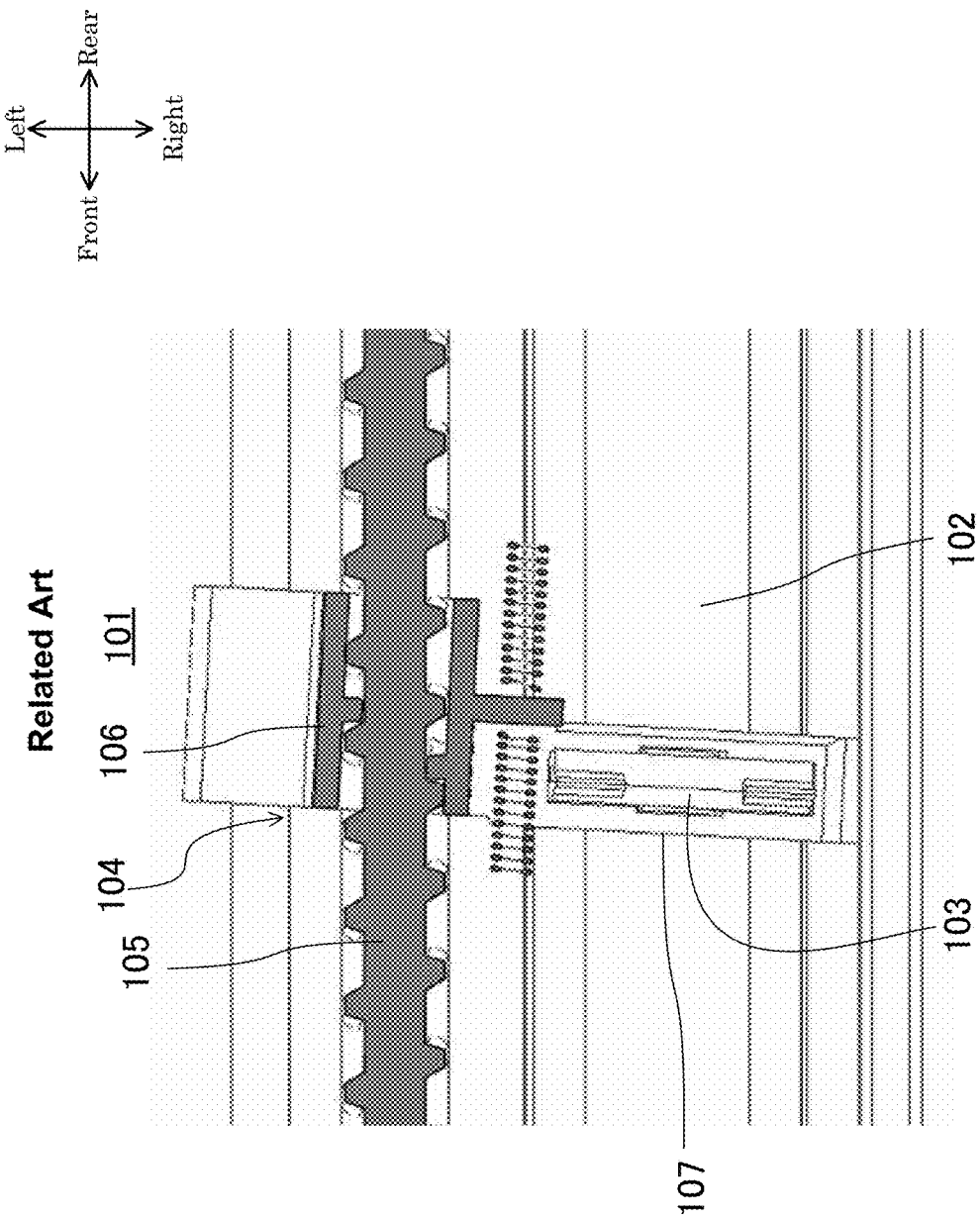

# OPTICAL SCANNING DEVICE AND IMAGE FORMING APPARATUS INCLUDING THE SAME

CROSS-REFERENCE TO RELATED APPLICATION

This application is based upon and claims the benefit of priority from Japanese Patent Application No. 2016-175894 filed on Sep. 8, 2016, the entire contents of which are incorporated herein by reference.

BACKGROUND

The technology of the present disclosure relates to an optical scanning device and an image forming apparatus including the same.

In the related art, an image forming apparatus employing an electrophotographic system, such as a copy machine and a printer, includes an optical scanning device that emits light for forming an electrostatic latent image on a photosensitive drum, and a developing device for developing the electrostatic latent image formed on the photosensitive drum as a toner image.

The optical scanning device has a housing that receives a polygon mirror, an image forming lens and the like. The housing is formed with light emitting ports through which light is emitted. The light emitting port includes an opening extending in a predetermined direction. The light emitting port is closed by a transparent cover.

When dirt, dust and the like due to toner and the like are attached to the surface of the transparent cover, there is a problem that the optical characteristics of the optical scanning device are deteriorated and thus image failure occurs. In this regard, there has been proposed a cleaning mechanism 101 as illustrated in FIG. 25 to FIG. 27. The cleaning mechanism 101 has a cleaning member 103 for cleaning a transparent cover 102, a holding member 104 for holding the cleaning member 103, and a screw shaft 105 for fitting and supporting the holding member 104.

The holding member 104 is configured to reciprocally move along the screw shaft 105 when the screw shaft 105 is rotated forward and backward by a motor. In this way, the cleaning member 103 reciprocally moves while abutting the surface of the transparent cover 102, so that the surface of the transparent cover 102 is cleaned by the cleaning member 103.

SUMMARY

An optical scanning device according to one aspect of the present disclosure includes a housing, a transparent cover, a cleaning member, a holding member, and a movement mechanism. The housing has light emitting ports extending in a predetermined direction. The transparent cover closes the light emitting ports. The cleaning member slidably contacts with the surface of the transparent cover to clean the surface. The holding member holds the cleaning member. The movement mechanism allows the holding member to reciprocally move along the transparent cover in the aforementioned predetermined direction.

The movement mechanism has two rail parts extending in a movement direction of the holding member. The holding member has a boss part and an arm part. The boss part receives power from the movement mechanism. The arm part extends from the boss part in a direction perpendicular to the movement direction of the holding member and holds the cleaning member. The boss part is mounted with a posture correction member. The posture correction member is mounted so as to be relatively movable in the movement direction of the holding member. The posture correction member is movably inserted into a groove between the two second rail parts. When the holding member moves, the posture correction member moves later than movement of the holding member, so that an inclined posture of the aforementioned holding member is corrected by the delay operation in a direction perpendicular to the aforementioned rail part.

BRIEF DESCRIPTION OF THE DRAWINGS

FIG. 27 is a transverse sectional plan view of a holding member during movement along a reciprocal movement path in a related art.

FIG. 28 is a view corresponding to FIG. 27, of a holding member that has been inclined in a related art.

DETAILED DESCRIPTION

Hereinafter, an embodiment of the present invention will be described in detail on the basis of the drawings. It is noted that the present invention is not limited to the following embodiments.

Embodiment

Figure 1:
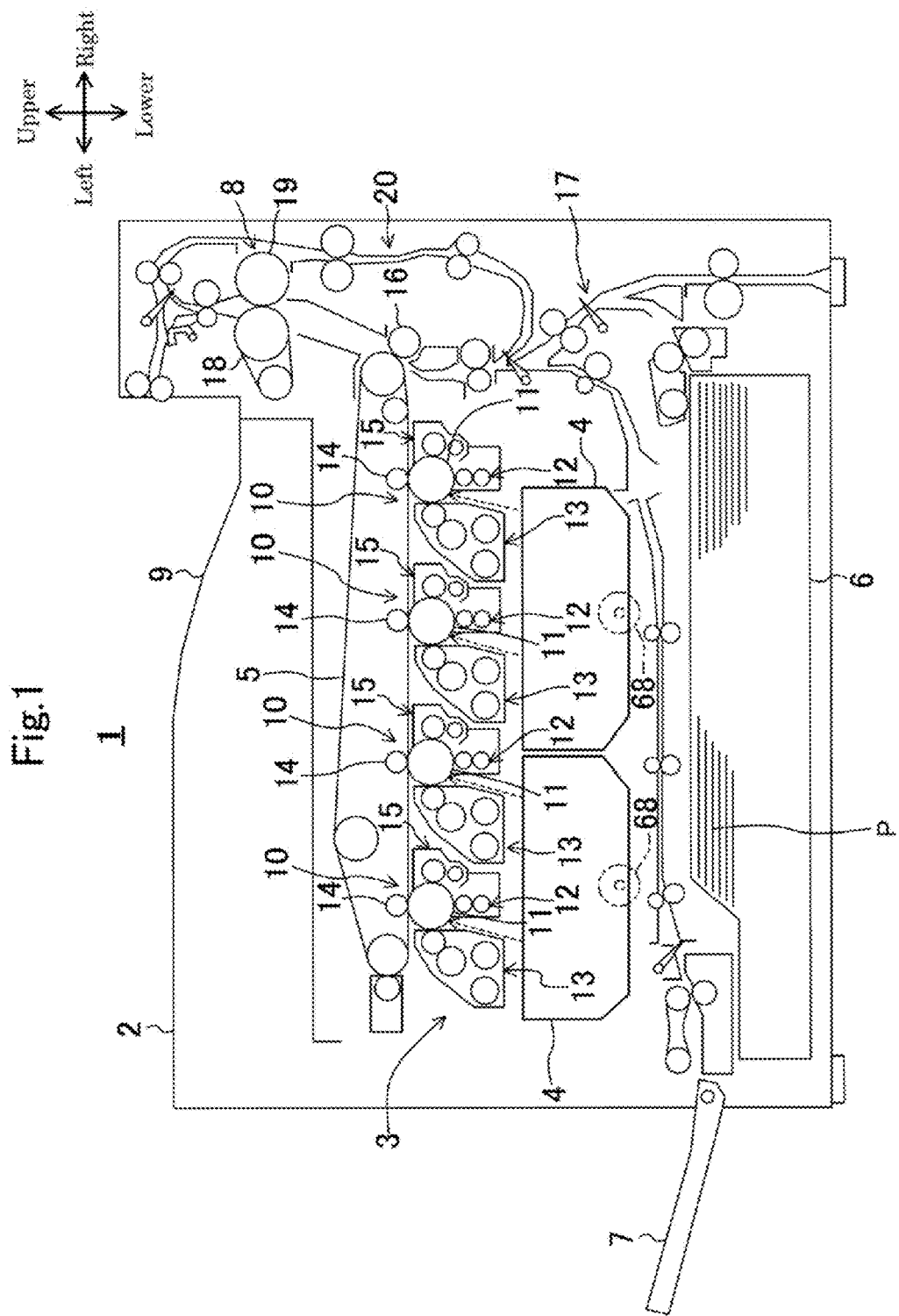
FIG. 1 is an overall view illustrating a schematic configuration of an image forming apparatus in an embodiment.

FIG. 1 illustrates a schematic configuration diagram of an image forming apparatus 1 according to an embodiment of the present invention. In the following description, it is assumed that a front side and a rear side indicate a front side and a rear side (a front side and a back side in a direction vertical to the sheet surface of FIG. 1) of the image forming apparatus 1, and a left side and a right side indicate a left side and a right side when the image forming apparatus 1 is viewed from the front side.

The image forming apparatus 1 is a tandem type color printer and has an image forming apparatus body 2 covered by a box-like casing. The image forming apparatus body 2 is provided therein with an image forming unit 3. The image forming unit 3 transfers an image to a recording sheet P and forms the image on the recording sheet P on the basis of image data transmitted from an external device such as a computer subjected to network connection and the like. Below the image forming unit 3, two optical scanning devices 4 are arranged to emit laser lights, and above the image forming unit 3, a transfer belt 5 is arranged. Below the two optical scanning devices 4, a sheet storage unit 6 is arranged to store the recording sheet P, and at the left side of the sheet storage unit 6, a manual sheet feeding unit 7 is arranged. At a right upper side of the transfer belt 5, a fixing unit 8 is arranged to perform a fixing process on the image transferred to and formed on the recording sheet P. A reference numeral 9 indicates a sheet discharge unit arranged at an upper portion of the image forming apparatus body 2 to discharge the recording sheet P subjected to the fixing process in the fixing unit 8.

The image forming unit 3 includes four image forming units 10 arranged in a row along the transfer belt 5. Each of the image forming units 10 has a photosensitive drum 11. Directly under each photosensitive drum 11, a charging device 12 is arranged, and at the left side of each photosensitive drum 11, a developing device 13 is arranged. Directly above each photosensitive drum 11, a primary transfer roller 14 is arranged, and at the right side of each photosensitive drum 11, a cleaning unit 15 is arranged to clean the peripheral surface of the photosensitive drum 11.

The peripheral surface of each photosensitive drum 11 is uniformly charged by the charging device 12, and laser lights based on predetermined image data are irradiated to the charged peripheral surface of each photosensitive drum 11 from the two optical scanning devices 4, so that an electrostatic latent image is formed on the peripheral surface of each photosensitive drum 11. A developer is supplied to the electrostatic latent image from the developing device 13, so that a toner image of yellow, magenta, cyan, or black is formed on the peripheral surface of each photosensitive drum 11. These toner images are respectively superposed on and transferred to the transfer belt 5 by a transfer bias applied to the primary transfer roller 14.

A reference numeral 16 indicates a secondary transfer roller arranged below the fixing unit 8 in the state of abutting the transfer belt 5, wherein the recording sheet P conveyed along a sheet conveyance path 17 from the sheet storage unit 6 or the manual sheet feeding unit 7 is interposed between the secondary transfer roller 16 and the transfer belt 5, and the toner images on the transfer belt 5 are transferred to the recording sheet P by a transfer bias applied to the secondary transfer roller 16.

The fixing unit 8 includes a heating roller 18 and a pressure roller 19, wherein the recording sheet P is interposed by the heating roller 18 and the pressure roller 19 so as to be pressed and heated, so that the toner images, which have been transferred to the recording sheet P, are fixed to the recording sheet P. The recording sheet P subjected to the fixing process is discharged to the sheet discharge unit 9. A reference numeral 20 indicates a reversing conveyance path for reversing the recording sheet P discharged from the fixing unit 8 at the time of duplex printing.

—Details of Optical Scanning Device—

The aforementioned two optical scanning devices 4 are arranged in a row in the right and left direction. The left optical scanning device 4 is configured to emit a laser light corresponding to magenta (M) and cyan (C), and the right optical scanning device 4 is configured to emit a laser light corresponding to yellow (Y) and black (K). Since the configurations of the two optical scanning devices 4 are equal to each other, only the configuration of the right optical scanning device 4 will be described below and the description of the left optical scanning device 4 is omitted.

Figure 2:
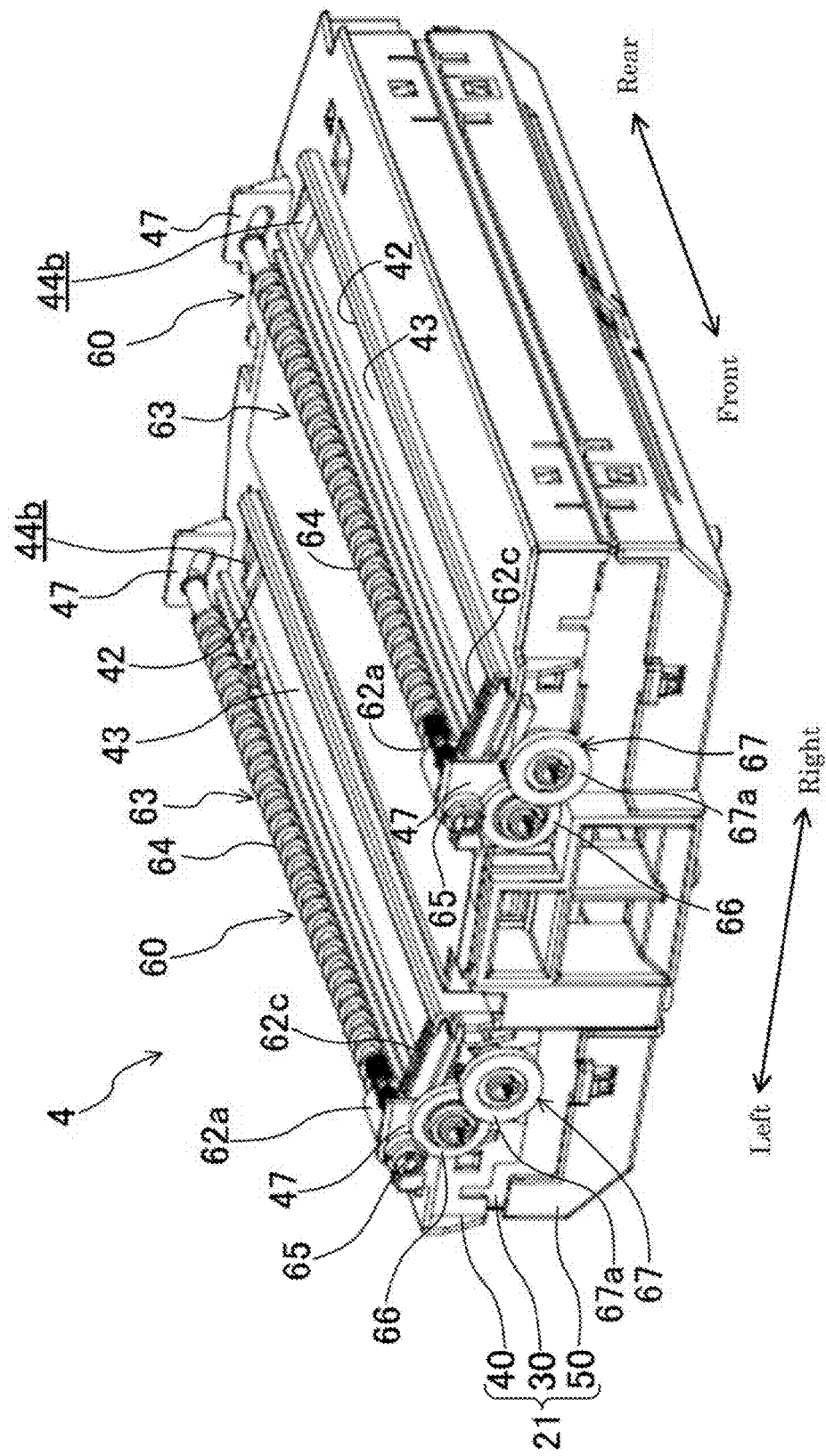
FIG. 2 is a perspective view of an optical scanning device viewed from a front oblique right side.
Figure 3:
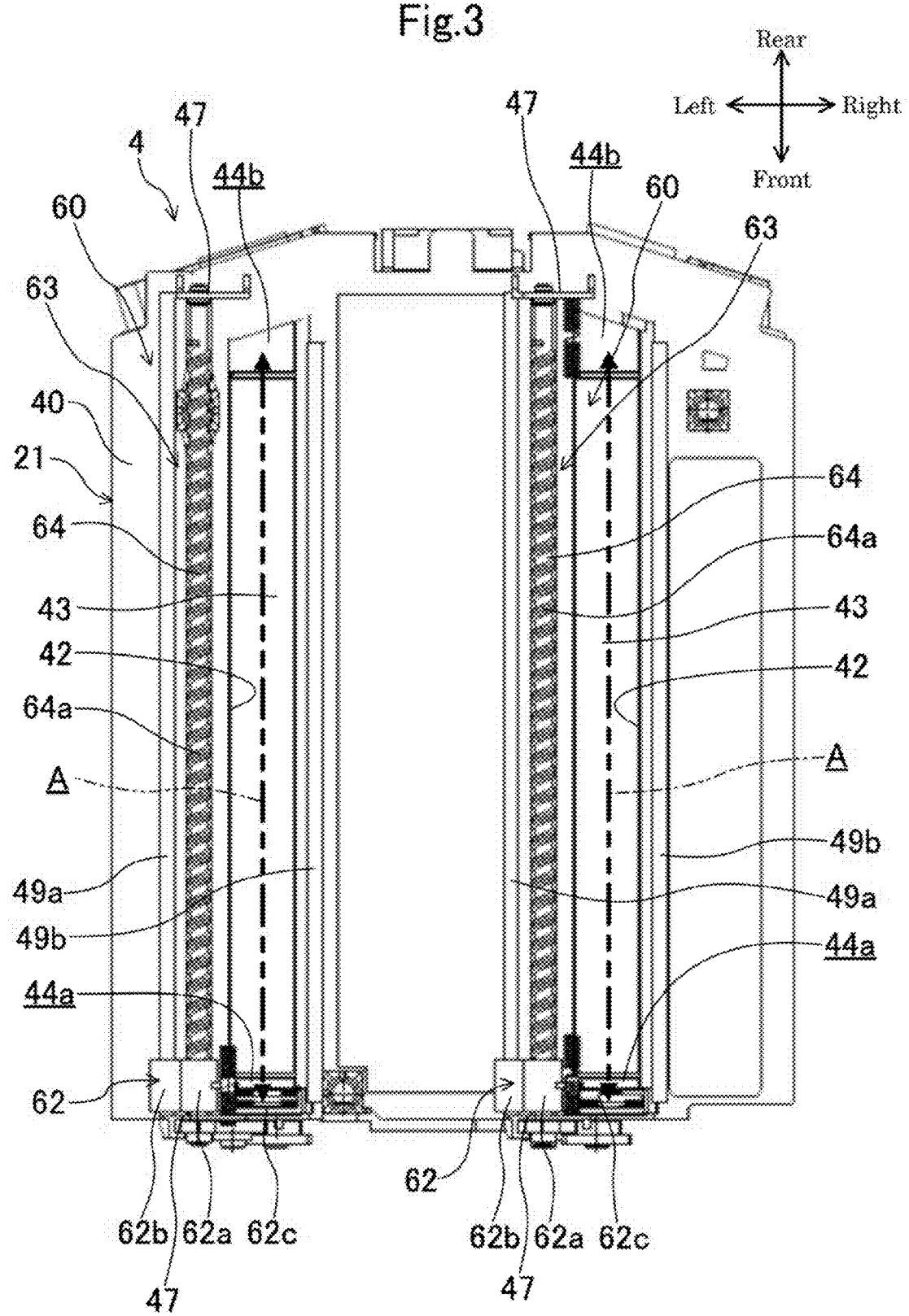
FIG. 3 is a plan view of an optical scanning device, viewed from an upper side.

As illustrated in FIG. 2 and FIG. 3, the optical scanning device 4 includes a resinous housing 21. The housing 21 has a flat sealed box shape. The housing 21 is configured with a bottomed box-like housing body 30 opened upward, an upper lid 40 that covers an upper side of the housing body 30, and a lower lid 50 that covers a lower side of the housing body 30. The upper lid 40 is formed with a pair of light emitting ports 42 arranged in the right and left direction. Each light emitting port 42 has a rectangular shape extending in the front and rear direction (a predetermined direction) and is closed by a glass cover 43 serving as a transparent cover. At places of the upper lid 40, which are adjacent to a front side and a rear side of each glass cover 43, a front concave part 44a and a rear concave part 44b are formed to allow foreign matters collected by a cleaning member 61, which will be described later, to fall down. Both the front concave part 44a and the rear concave part 44b are opened upward.

Although not illustrated in the drawings, the housing body 30 is provided therein with a light source that generates a pair of laser lights corresponding to yellow (Y) and black (K) (or magenta (M) and cyan (C)), a polygon mirror for deflecting the laser lights, and an optical element group that forms images of the deflected laser lights on the surfaces of the photosensitive drums 11. The pair of laser lights emitted from the light source are scanned by the polygon mirror in the main scanning direction, the images of the laser lights are formed by the optical element group, and then the pair of laser lights are emitted toward the photosensitive drums 11 corresponding to each color from the light emitting ports 42 formed in the upper lid 40.

Figure 4:
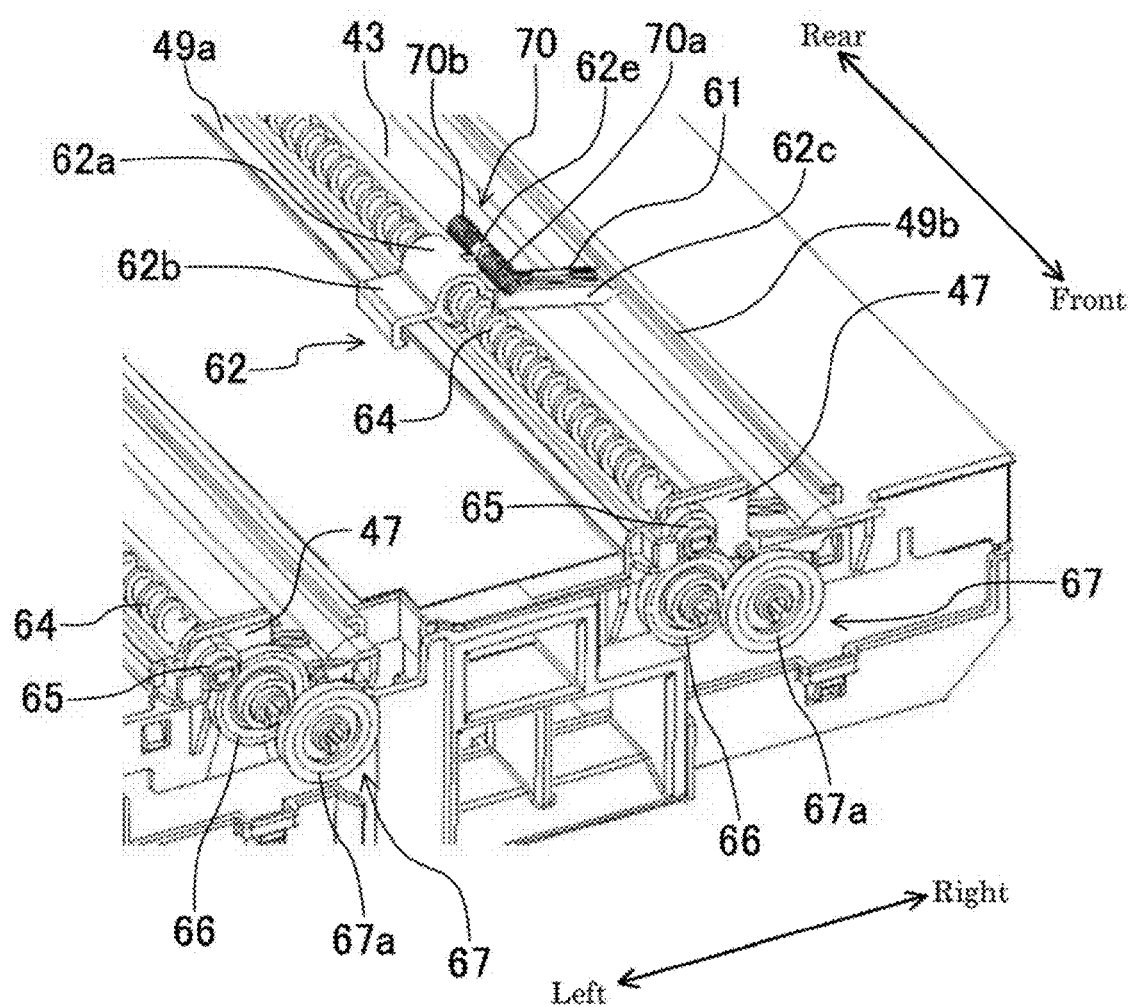
FIG. 4 is a perspective view of a front side part of an optical scanning device viewed from a front oblique left side.
Figure 5:
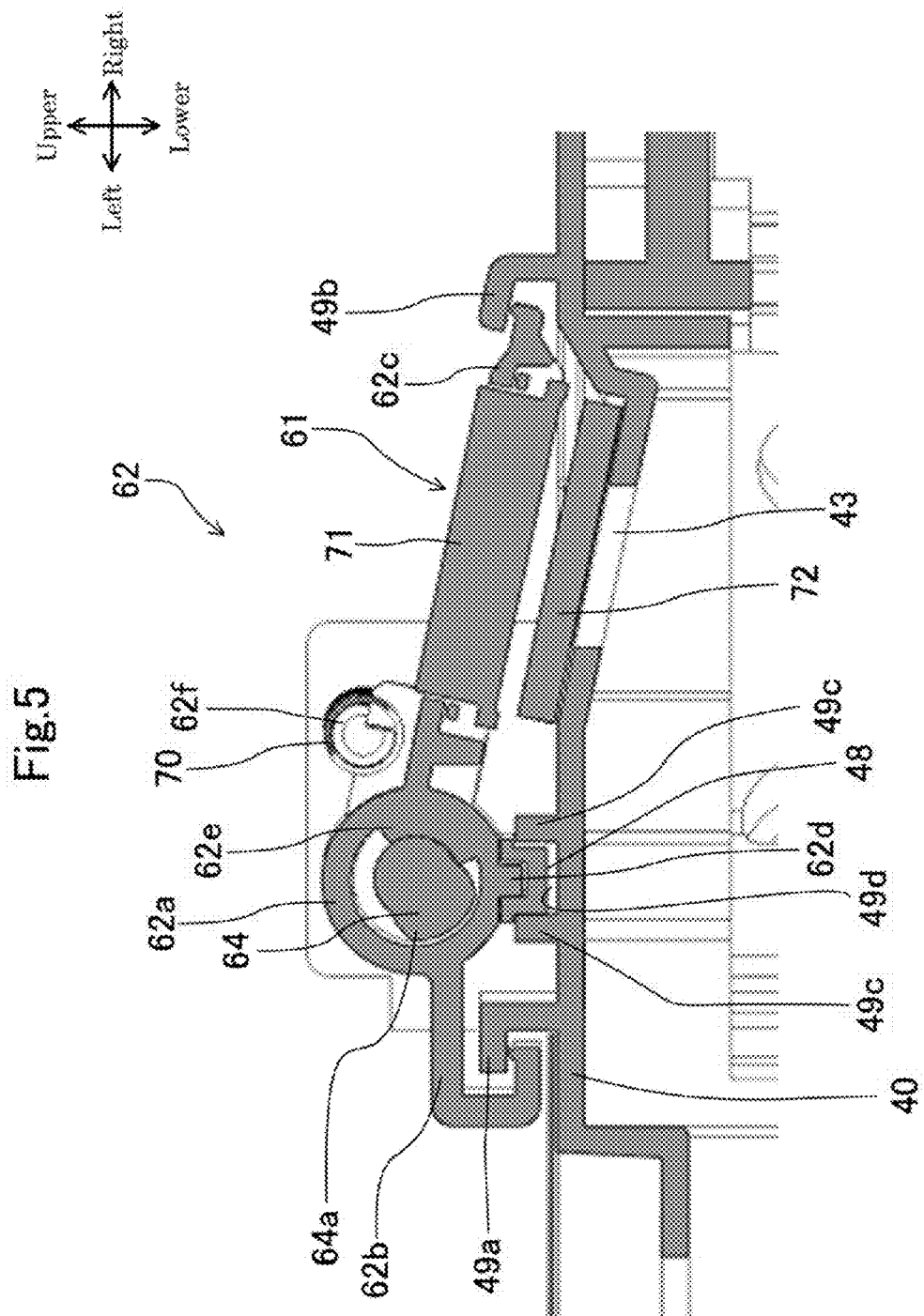
FIG. 5 is a schematic view of a holding member, viewed from an axial direction of a screw shaft.
Figure 6:
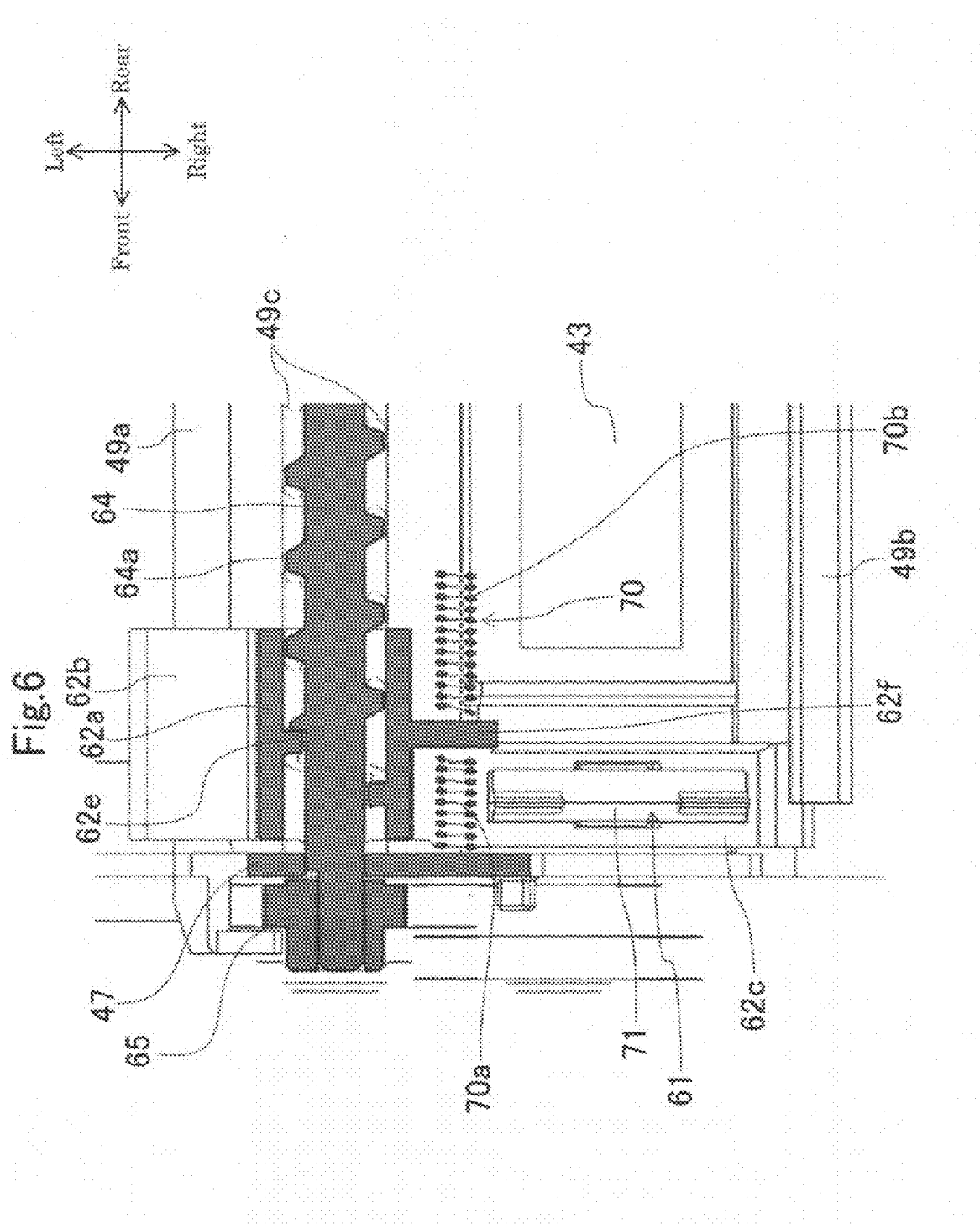
FIG. 6 is a transverse sectional plan view of a holding member, in which a boss part abuts a front bearing plate.

The upper lid 40 is provided on the upper surface thereof with a pair of cleaning mechanisms 60 for automatically cleaning the glass covers 43. Each cleaning mechanism 60 has a cleaning member 61 that slidably contacts with the surface of the glass cover 43 to clean the surface, and a holding member 62 (see FIG. 4 and FIG. 5) that holds the cleaning member 61, and a movement mechanism 63 that allows the holding member 62 to reciprocally move along the glass cover 43 in the front and rear direction.

Figure 7:
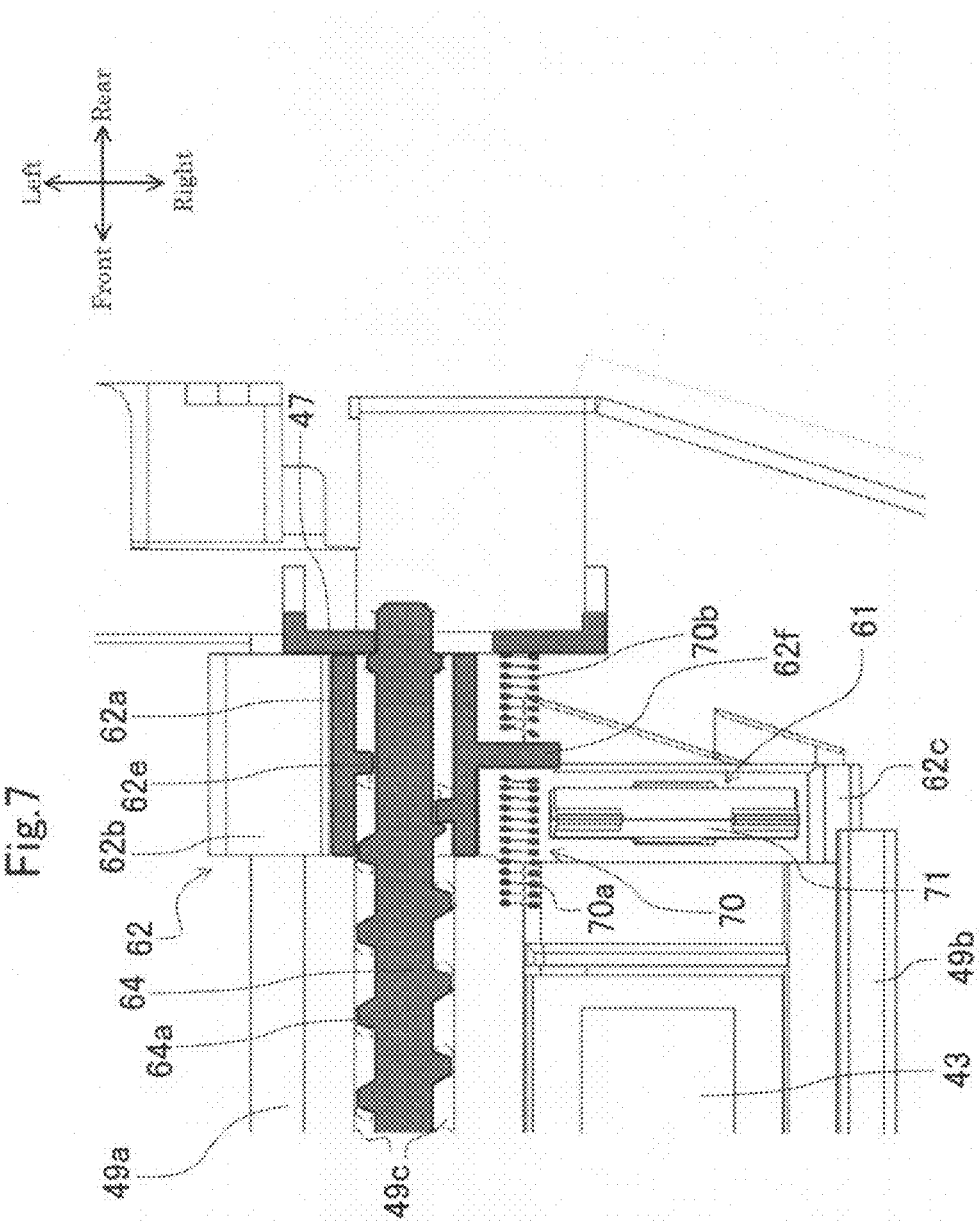
FIG. 7 is a transverse sectional plan view of a holding member, in which a boss part abuts a rear bearing plate.
Figure 8:
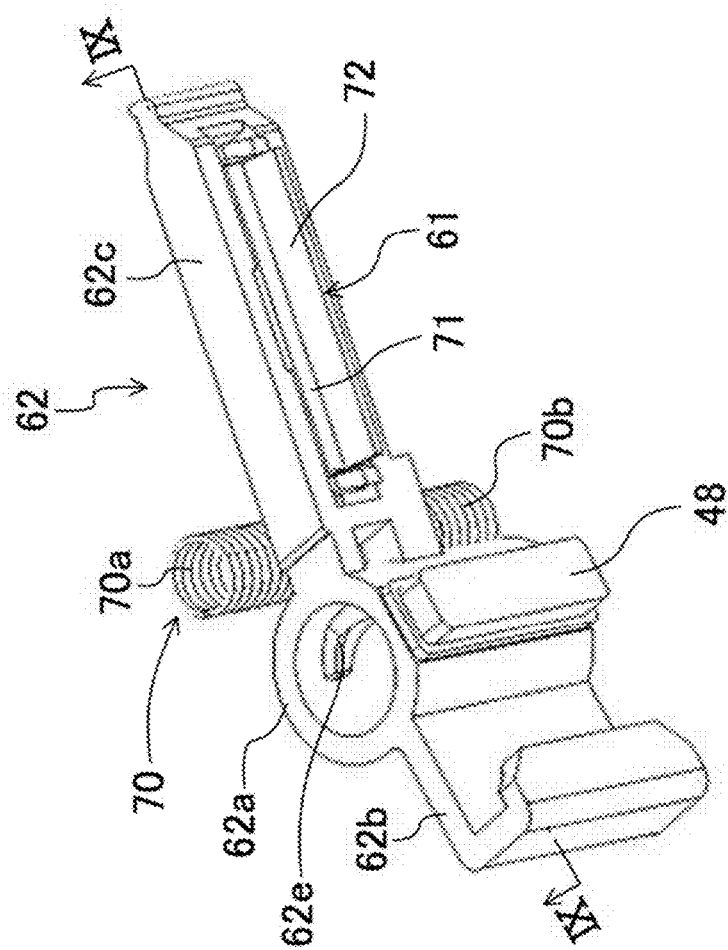
FIG. 8 is a perspective view of a holding member viewed from an oblique lower side.
Figure 9:
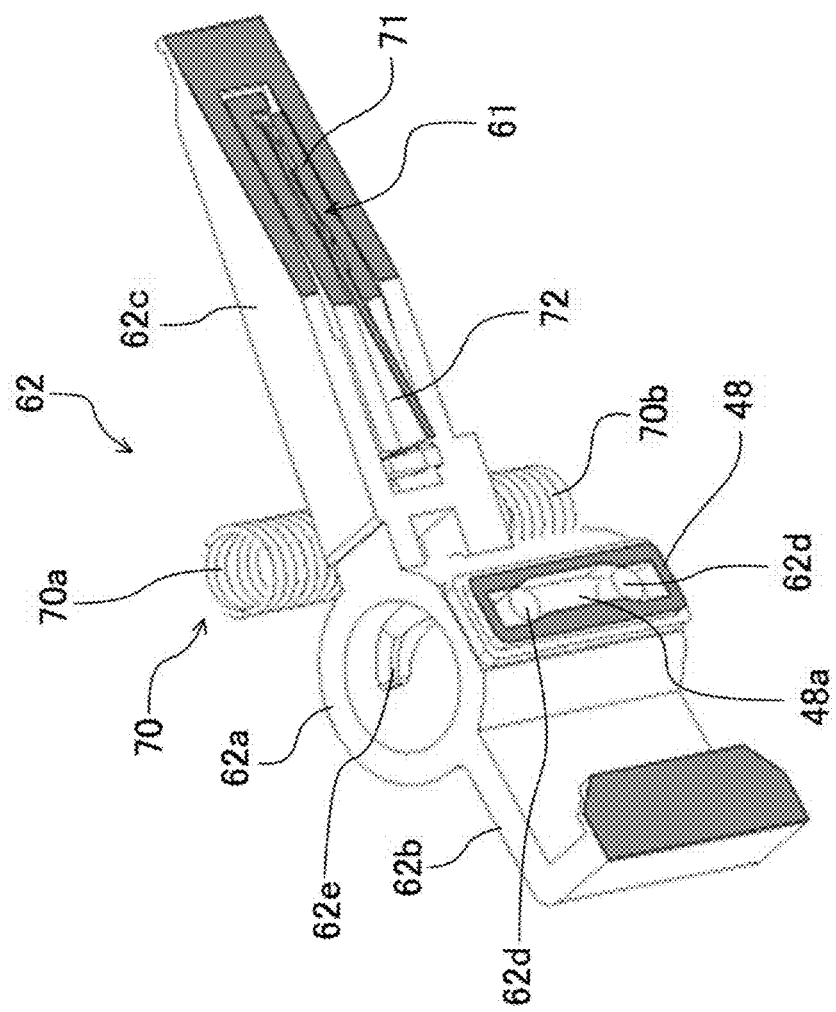
FIG. 9 is a view viewed from an arrow line IX-IX of FIG. 8.
Figure 10:
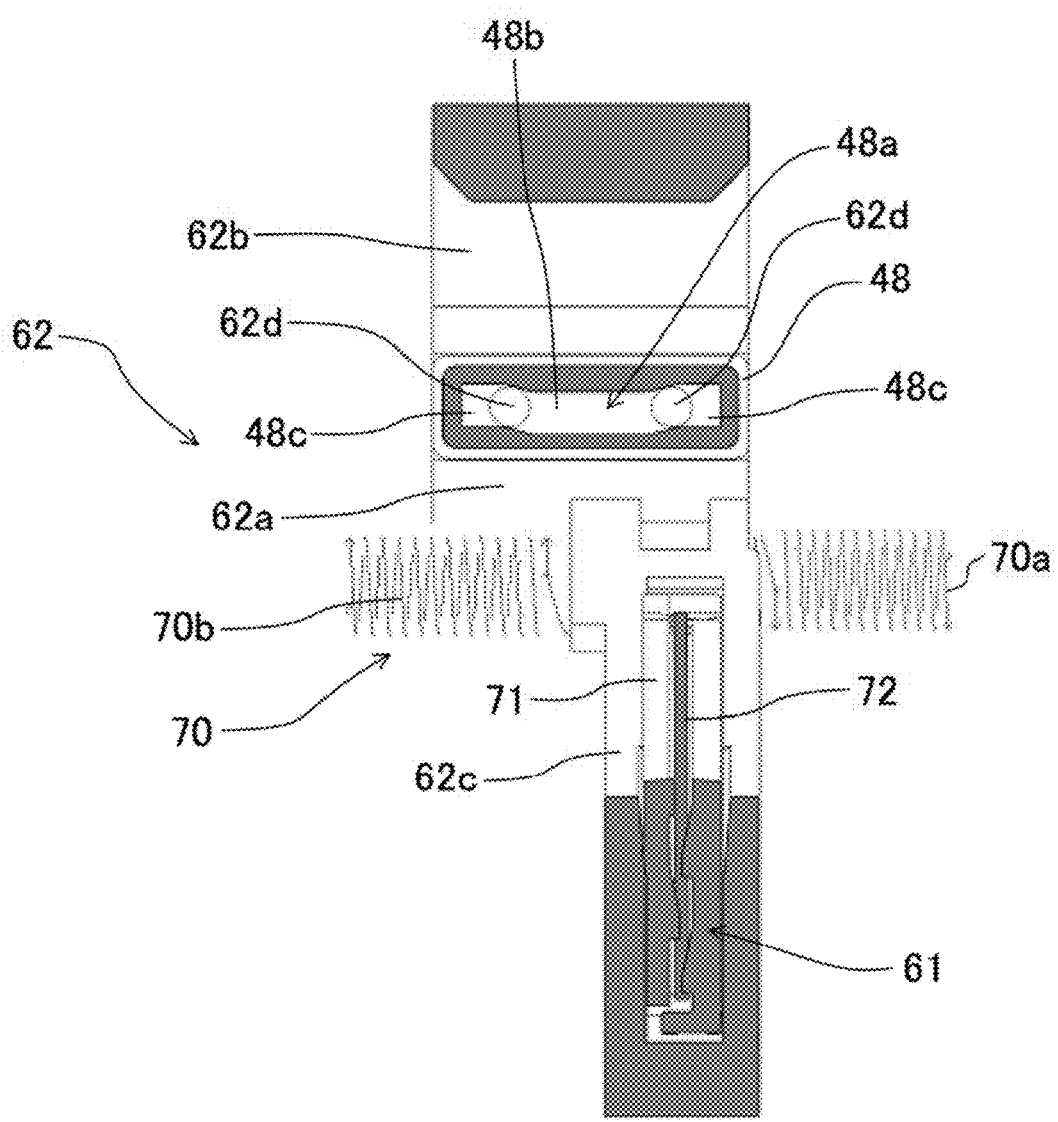
FIG. 10 is a bottom view of FIG. 9.
Figure 11:
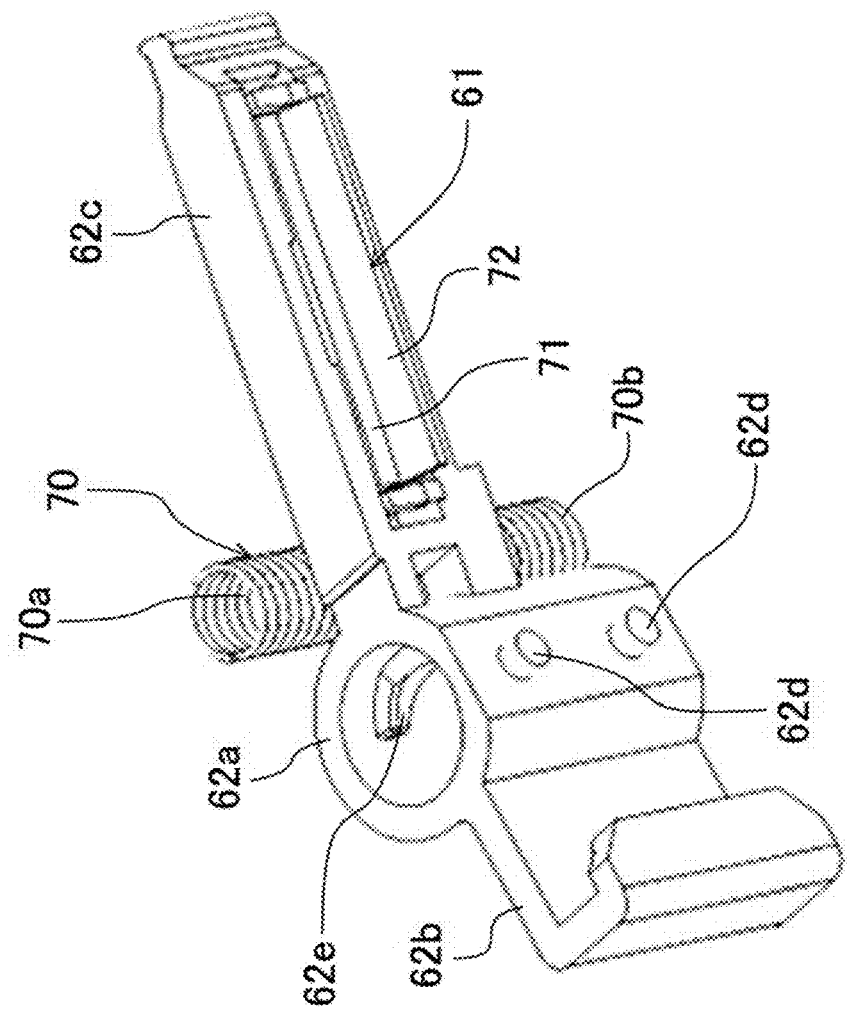
FIG. 11 is a view corresponding to FIG. 8 of a holding member before a posture correction member is mounted.

The movement mechanism 63 has a screw shaft 64 extending along the glass cover 43 in the front and rear direction, a first rail part 49a extending in the movement direction (the front and rear direction) of the holding member 62, a second rail part 49c, and a third rail part 49b. Both ends of the screw shaft 64 are supported to bearing plates 47. On the outer peripheral surface of the screw shaft 64, a spiral screw thread 64a (see FIG. 5 and FIG. 7) is continuously formed in the longitudinal direction, and the holding member 62 is fitted and supported to the screw shaft 64.

As illustrated in FIG. 5 to FIG. 11, the holding member 62 is made of resin and includes a cylindrical boss part 62a externally fitted to the screw shaft 64 to directly receive power from the screw shaft 64. From a left surface of the boss part 62a, a left arm part 62b extends leftward. A distal end portion of the left arm part 62b is engaged with a left side first rail part 49a having a sectional L shape and protruding from the upper surface of the upper lid 40. From a lower surface of the boss part 62a, two engagement protrusions 62d protrude while being spaced apart from each other in the front and rear direction. The engagement protrusions 62d are engaged with a groove 49d between two second rail parts 49c, which extend on the upper surface of the upper lid 40 in the front and rear direction at the right of the first rail part 49a, via a posture correction member 48 to be described later.

From a right surface of the boss part 62a, a right arm part 62c for holding the cleaning member 61 extends rightward in a direction perpendicular to the movement direction of the holding member 62 so as to be longer than the left arm part 62b. A distal end portion of the right arm part 62c is engaged with a right side third rail part 49b having a sectional L shape and protruding from the upper surface of the upper lid 40. In this way, the holding member 62 is guided by the first rail part 49a, the second rail parts 49c, and the third rail part 49b so as to be movable in the front and rear direction.

Figure 12A:
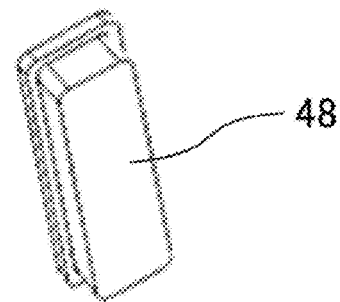
FIG. 12A is a perspective view of a posture correction member viewed from a counter mounting side.
Figure 12B:
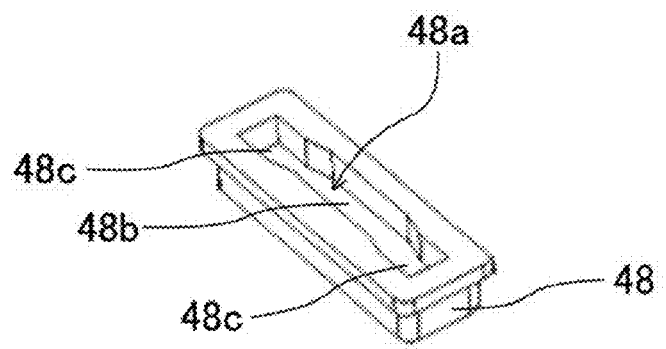
FIG. 12B is a perspective view of a posture correction member viewed from a mounting side.
Figure 12C:
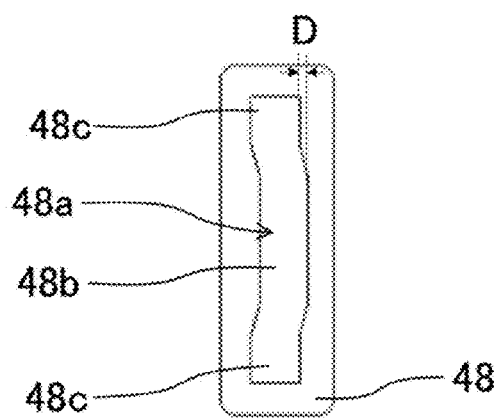
FIG. 12C is a plan view of FIG. 12B.

The posture correction member 48 includes an elastic member (for example, rubber) or resin, and is inserted into the groove 49d between the two second rail parts 49c so as to be movable. As illustrated in FIG. 12A, FIG. 12B, and FIG. 12C, the posture correction member 48 has a rectangular parallelepiped shape and in one side of the posture correction member 48, a rectangular groove-like concave part 48a is formed so as to be opened such that the engagement protrusions 62d are relatively movable. The groove-like concave part 48a has a first concave portion 48b in the middle of the movement direction of the holding member 62, and two second concave portions 48c continued to both sides of the first concave portion 48b and positioned in a direction separated from the cleaning member 61 more than the first concave portion 48b. A separation amount between the first concave portion 48b and the second concave portion 48c is set as an amount by which an inclined posture of the holding member 62 is corrected in a direction perpendicular to the second rail parts 49c.

That is, the engagement protrusions 62d of the boss part 62a are inserted into the groove-like concave part 48a of the posture correction member 48, so that the posture correction member 48 is mounted at the boss part 62a so as to be relatively movable in the movement direction of the holding member 62.

Furthermore, when the holding member 62 moves, the posture correction member 48 moves later than the movement of the holding member 62, thereby correcting the inclined posture of the holding member 62 by the delay operation in the direction perpendicular to the second rail parts 49c. The details will be described later on the basis of FIG. 16 to FIG. 21. However, the engagement protrusion 62d of the movement direction side of the holding member 62 relatively moves in the second concave portion 48c of the movement direction side of the holding member 62 and the engagement protrusion 62d of the counter movement direction side of the holding member 62 relatively moves to the first concave portion 48b from the second concave portion 48c of the counter movement direction side of the holding member 62, so that the inclined posture of the holding member 62 is corrected in the direction perpendicular to the second rail parts 49c.

The boss part 62a is formed on the inner peripheral surface thereof with a spiral screw thread 62e for about one circumference, and in a state in which the boss part 62a is externally fitted to the screw shaft 64, the screw thread 62e of the boss part 62a is screwed into the screw thread 64a of the screw shaft 64.

From an upper base end of the right arm part 62c, a spring mounting part 62f protrudes, and a spring 70 is mounted to the spring mounting part 62f so as to extend to both front and rear sides of the spring mounting part 62f. A part protruding to the front side of the spring mounting part 62f is defined as a front spring part 70a and a part protruding to the rear side of the spring mounting part 62f is defined as a rear spring part 70b.

Figure 13:
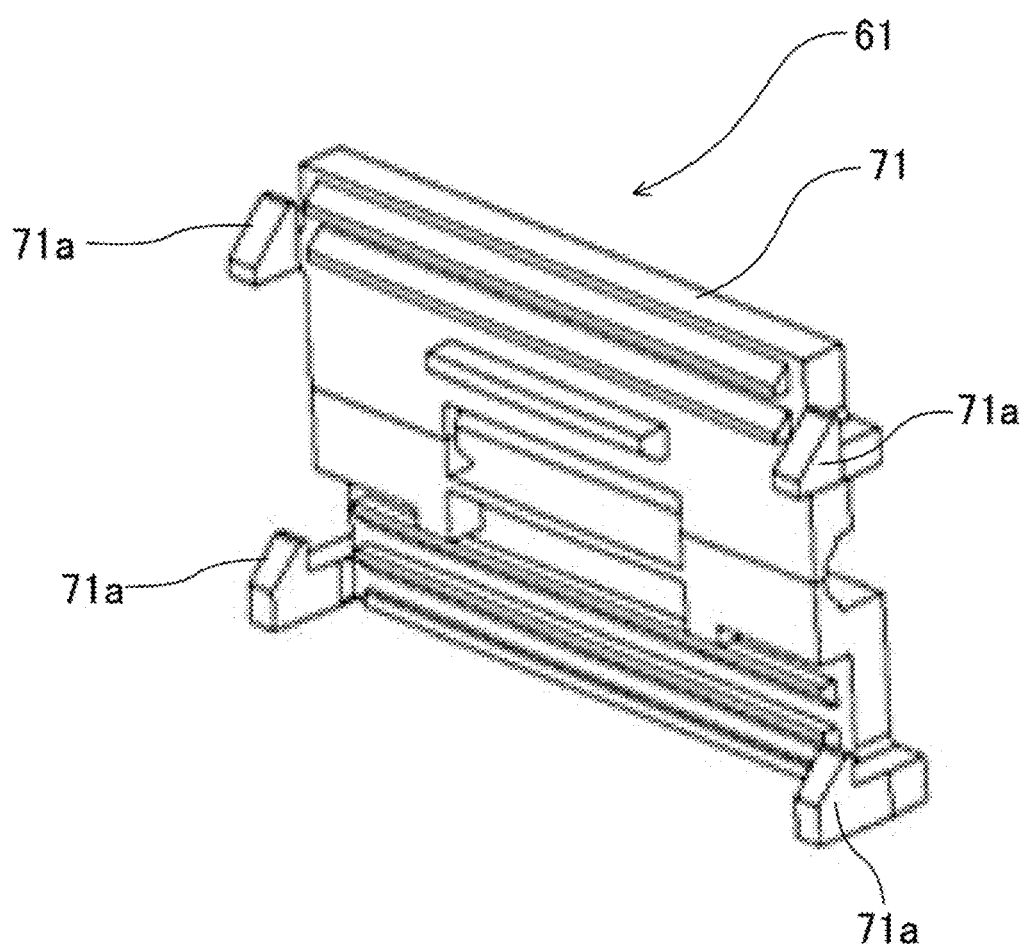
FIG. 13 is a perspective view of a plate-like holder of a cleaning member.
Figure 14:
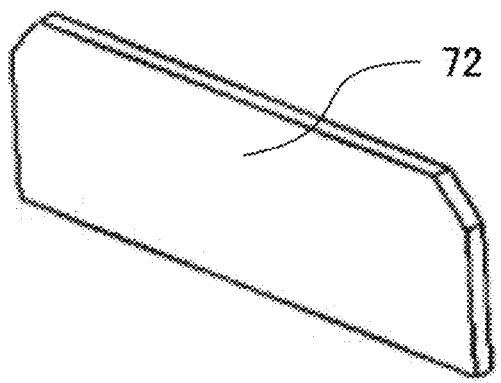
FIG. 14 is a perspective view of a blade of a cleaning member.
Figure 15:
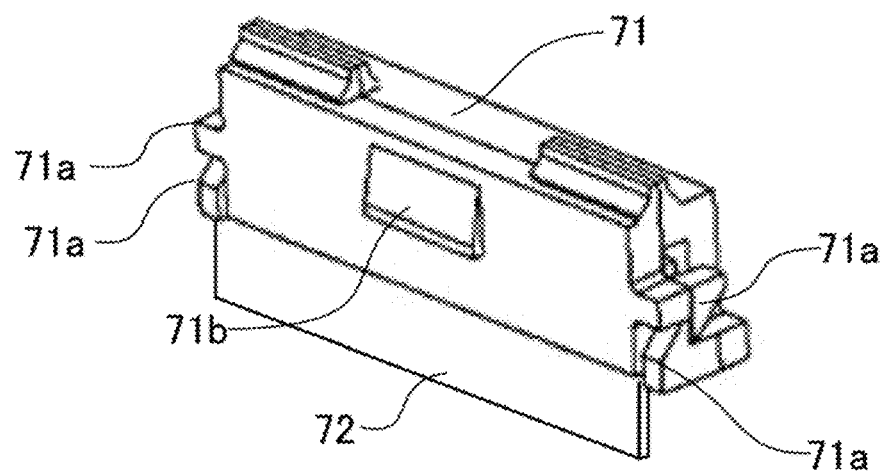
FIG. 15 is a perspective view of a cleaning member.

The cleaning member 61 is configured by allowing a blade 72 (see FIG. 14), which includes an elastic member (for example, a silicon pad) abutting the upper surface of the glass cover 43, to be held as illustrated in FIG. 15 in a two-folded resinous plate-like holder 71 having engagement pieces 71a at four corners as illustrated in FIG. 13, by allowing the engagement pieces 71a vertically adjacent to each other to be engaged with each other, and by assembling the blade 72 to the holder 71. In the cleaning member 61 configured as described above, a locking convex part 71b (see FIG. 15) formed on a side surface of the holder 71 is locked with a locking concave part (not illustrated) of an inner surface of a mounting hole vertically passing through the right arm part 62c, so that the cleaning member 61 is mounted to the right arm part 62c as illustrated in FIG. 8 to FIG. 11.

The movement mechanism 63 has a driven gear 65, an idle gear 66, and an input gear 67 in addition to the screw shaft 64 (see FIG. 2). The driven gear 65 is fixed to a front end portion of the screw shaft 64 and is rotated together with the screw shaft 64. The idle gear 66 is meshed with the driven gear 65 from a right oblique lower side. The input gear 67 has a small diameter gear part (not illustrated) and a large diameter gear part 67a arranged coaxially with each other. The small diameter gear part of the input gear 67 is meshed with the idle gear 66 from a right oblique lower side. The idle gear 66 and the input gear 67 are respectively held to the front side surface of the upper lid 40 via shaft members so as to rotatable. The large diameter gear part 67a of the input gear 67 is meshed with a motor gear when the optical housing 21 is set at a predetermined place of the image forming apparatus body 2 from an upper side. The motor gear is connected to a motor 68 (illustrated only in FIG. 1) provided in the image forming apparatus body 2 so as to be able to transmit power. The motor 68, for example, may also serve as a motor for driving a sheet conveyance mechanism in the image forming apparatus body 2.

When the cleaning mechanism 60 operates, the screw shaft 64 is driven by the motor 68 in both forward and backward directions. As a consequence, the screw shaft 64 is rotated together with the driven gear 65, so that the holding member 62 fitted and supported to the screw shaft 64 reciprocally moves in the front and rear direction. In this way, the blade 72 of the cleaning member 61 held to the holding member 62 reciprocally moves in the front and rear direction while abutting the upper surface of the glass cover 43, so that the surface of the glass cover 43 is cleaned.

A reciprocal movement path A (see FIG. 3) of the cleaning member 61 is a linear movement path extending in the front and rear direction, and in the present embodiment, a rear moving end of the reciprocal movement path A serves as a waiting position. This waiting position is a position at which the cleaning member 61 having completed a reciprocal operation waits until a next reciprocal operation starts. The waiting position is positioned at an upper side of the rear concave part 44b formed in the upper surface of the upper lid 40. On the other hand, a front moving end (a moving end opposite to the waiting position) of the reciprocal movement path A is positioned at a lower side of the front concave part 44a formed in the upper surface of the upper lid 40. That is, the bearing plates 47, which the holding member 62 abuts by reciprocally moving, serve as the front moving end and the rear moving end. Foreign matters, which are collected on the glass covers 43 while the cleaning member 61 is moving to the front moving end from the waiting position (the rear moving end of the reciprocal movement path A) after the cleaning mechanism 60 operates, are fallen into the front concave part 44a. On the other hand, foreign matters, which are collected on the glass covers 43 while the cleaning member 61 is returning to the rear moving end after reaching the front moving end, are fallen into the rear concave part 44b. The fallen foreign matters are sucked to a cooling air passage side by negative pressure of airflow flowing through a cooling air passage (not illustrated).

Hereinafter, the operation for cleaning the glass cover 43 in the image forming apparatus 1 of the present embodiment will be described in detail with reference to FIG. 16 to FIG. 21.

Figure 16:
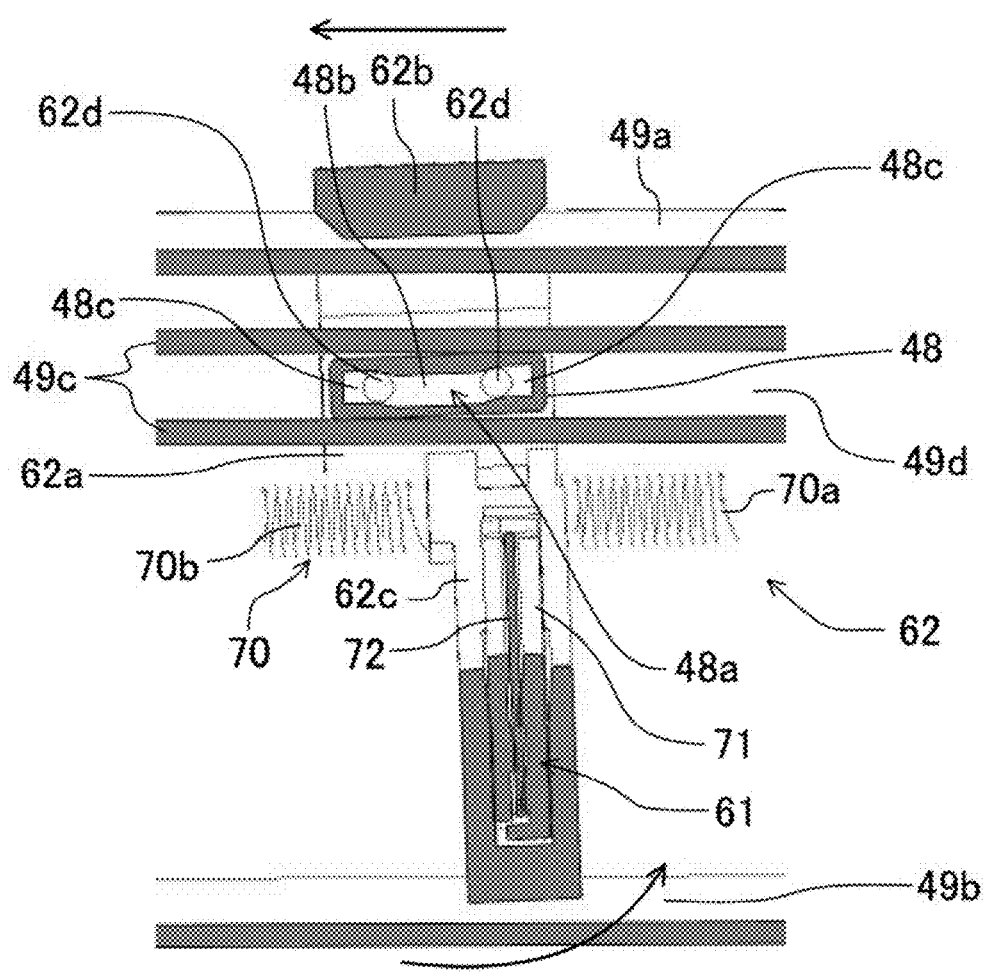
FIG. 16 is a transverse sectional view of a holding member viewed from a lower side, in which the holding member has been inclined rearward during movement along a reciprocal movement path.
Figure 17:
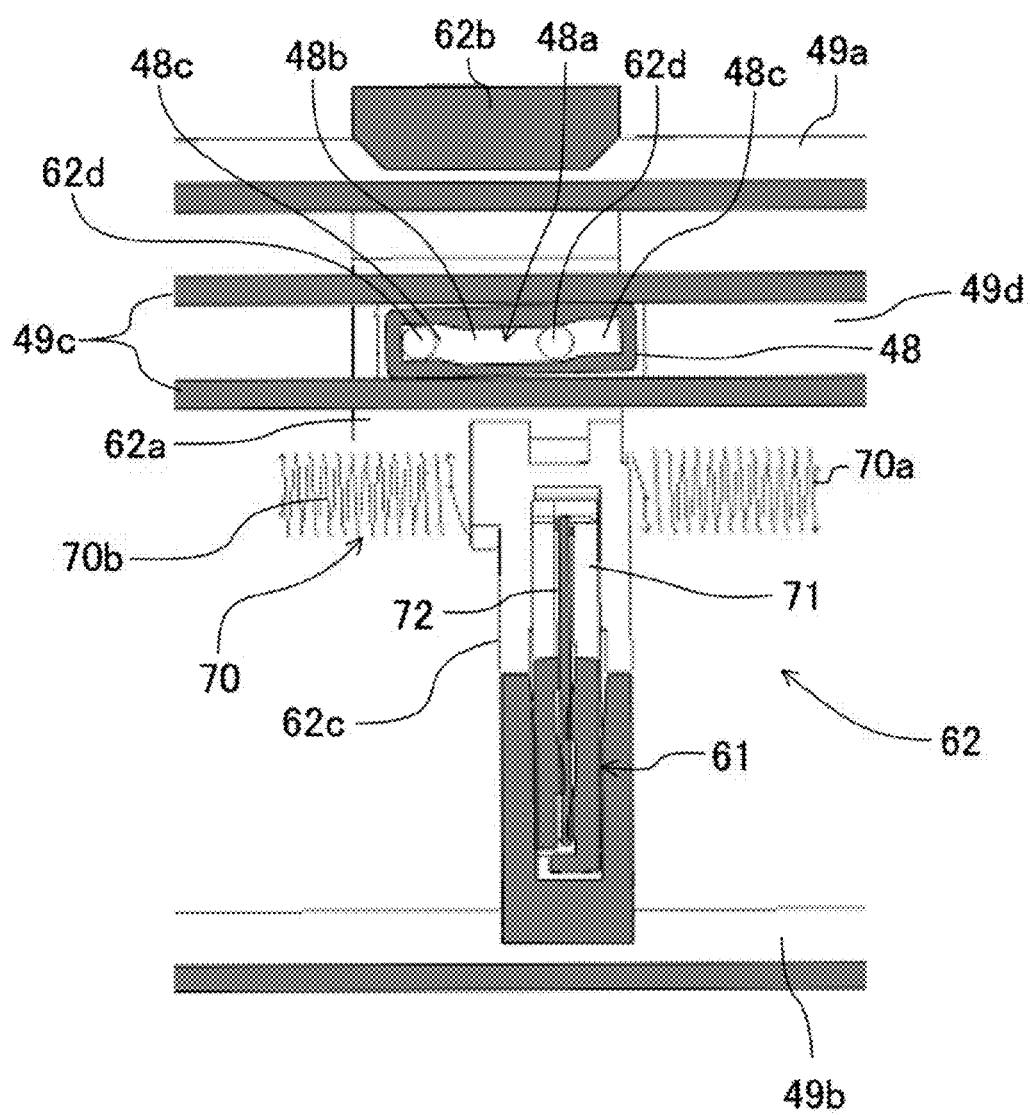
FIG. 17 is a transverse sectional view of a holding member viewed from a lower side, in which the posture of the holding member inclined rearward during movement along a reciprocal movement path has been corrected.
Figure 20:
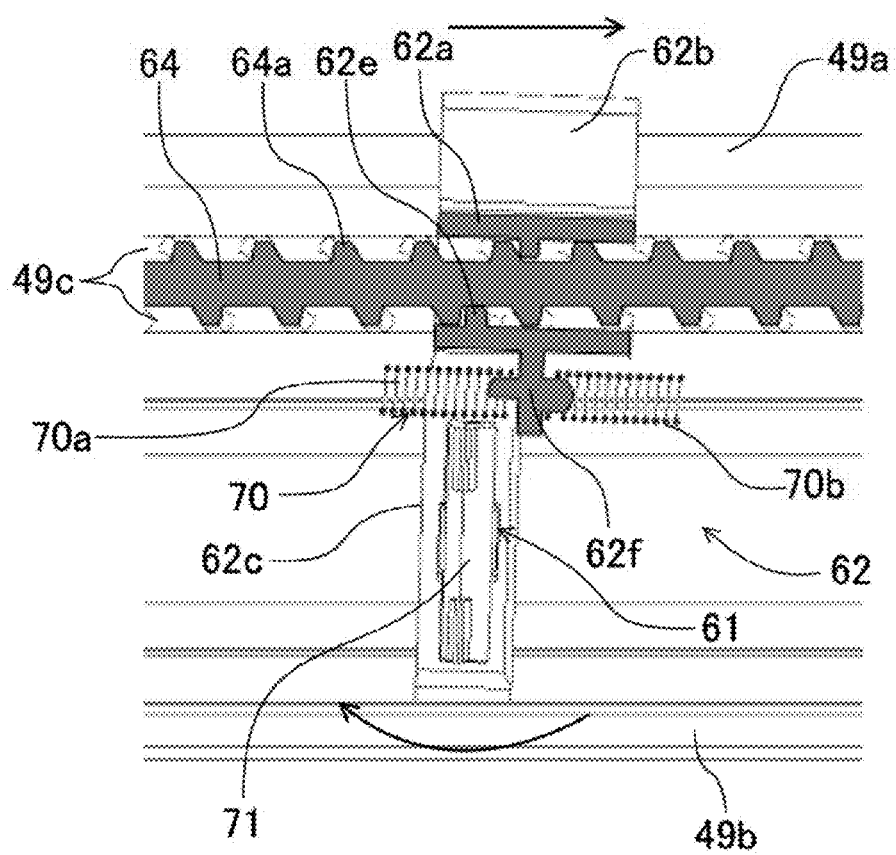
FIG. 20 is a transverse sectional view of a holding member viewed from a upper side, in which the holding member has been inclined rearward during movement along a reciprocal movement path.

FIG. 16 is a transverse sectional view of the holding member 62 viewed from a lower side, in which the holding member has been inclined rearward during movement along the reciprocal movement path A. FIG. 20 is a transverse sectional view of the holding member 62 viewed from an upper side, in which the holding member has been inclined rearward during movement along the reciprocal movement path A. That is, in FIG. 16 and FIG. 20, when the screw shaft 64 rotates, the holding member 62 and the cleaning member 61 move along the screw shaft 64 toward the rear moving end (the left side of FIG. 16 and the right side of FIG. 20) of the reciprocal movement path A, so that the blade 72 cleans the surface of the glass cover 43. In this state, the right arm part 62c of the holding member 62 is inclined to the front moving end side (the right side of FIG. 16 and the left side of FIG. 20), so that the posture correction member 48 is pressed to the side surface of the groove 49d of the second rail parts 49c. By this pressing resistance, since the posture correction member 48 moves later than the movement of the holding member 62, the engagement protrusion 62d of the movement direction side (the left side of FIG. 16) of the holding member 62 relatively moves in the second concave portion 48c of the movement direction side (the left side of FIG. 16) of the holding member 62 by the delay operation to abut an end portion in the movement direction of the holding member 62 in the groove-like concave part 48a and the engagement protrusion 62d of the counter movement direction side (the right side of FIG. 16) of the holding member 62 relatively moves to the first concave portion 48b from the second concave portion 48c of the counter movement direction side (the right side of FIG. 16) of the holding member 62, so that the inclined posture of the holding member 62 is corrected in the direction perpendicular to the second rail parts 49c. FIG. 17 is a transverse sectional view of the holding member 62 viewed from a lower side, in which the posture of the holding member 62 inclined rearward during movement along the reciprocal movement path A has been corrected. In this way, the holding member 62 and the cleaning member 61 are not inclined and stably move to the rear moving end (the left side of FIG. 16 and the right side of FIG. 20) of the reciprocal movement path A, so that the boss part 62a stops by abutting the rear bearing plate 47. Consequently, there is no unwiped portion at the rear side of the transparent cover 102. In this state, the screw thread 62e of the boss part 62a is detached from the screw thread 64a of the screw shaft 64; however, since the rear spring part 70b of the spring 70 abuts the bearing plate 47 and is compressed, the boss part 62a is immediately and slightly pushed back frontward by the compression force of the rear spring part 70b, so that the screw thread 62e of the boss part 62a is meshed with the screw thread 64a of the screw shaft 64.

Figure 18:
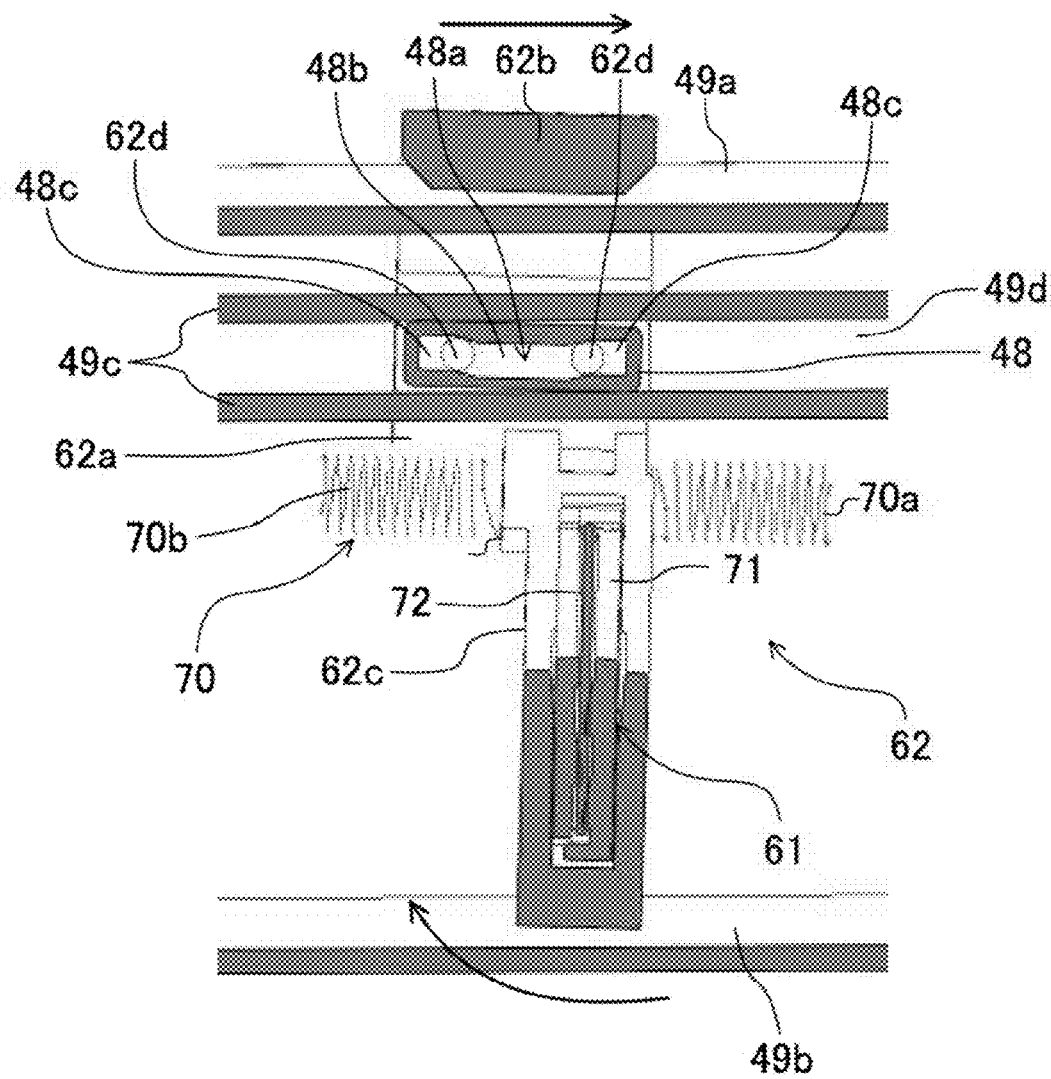
FIG. 18 is a transverse sectional view of a holding member viewed from a lower side, in which the holding member has been inclined frontward during movement along a reciprocal movement path.
Figure 19:
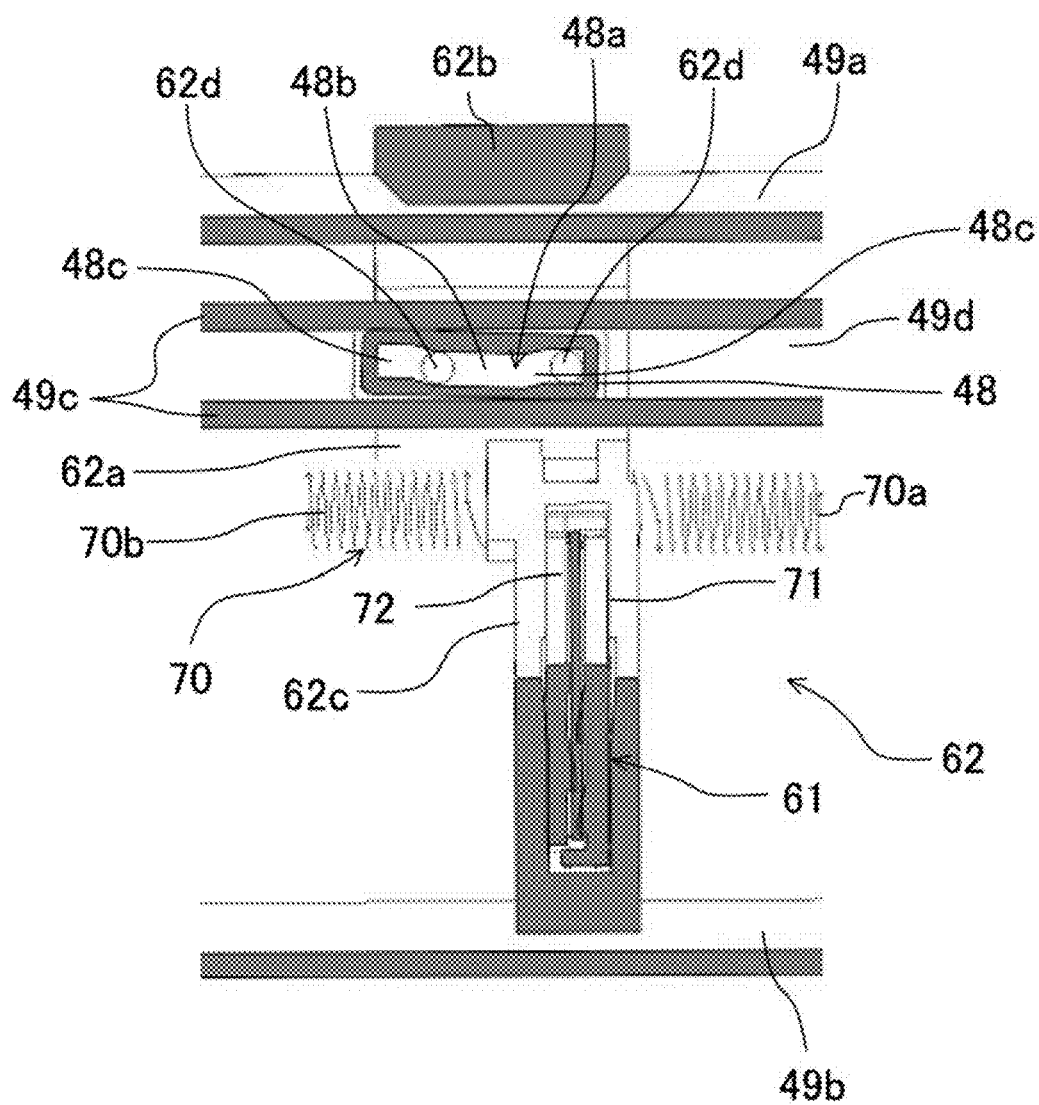
FIG. 19 is a transverse sectional view of a holding member viewed from a lower side, in which the posture of the holding member inclined frontward during movement along a reciprocal movement path has been corrected.
Figure 21:
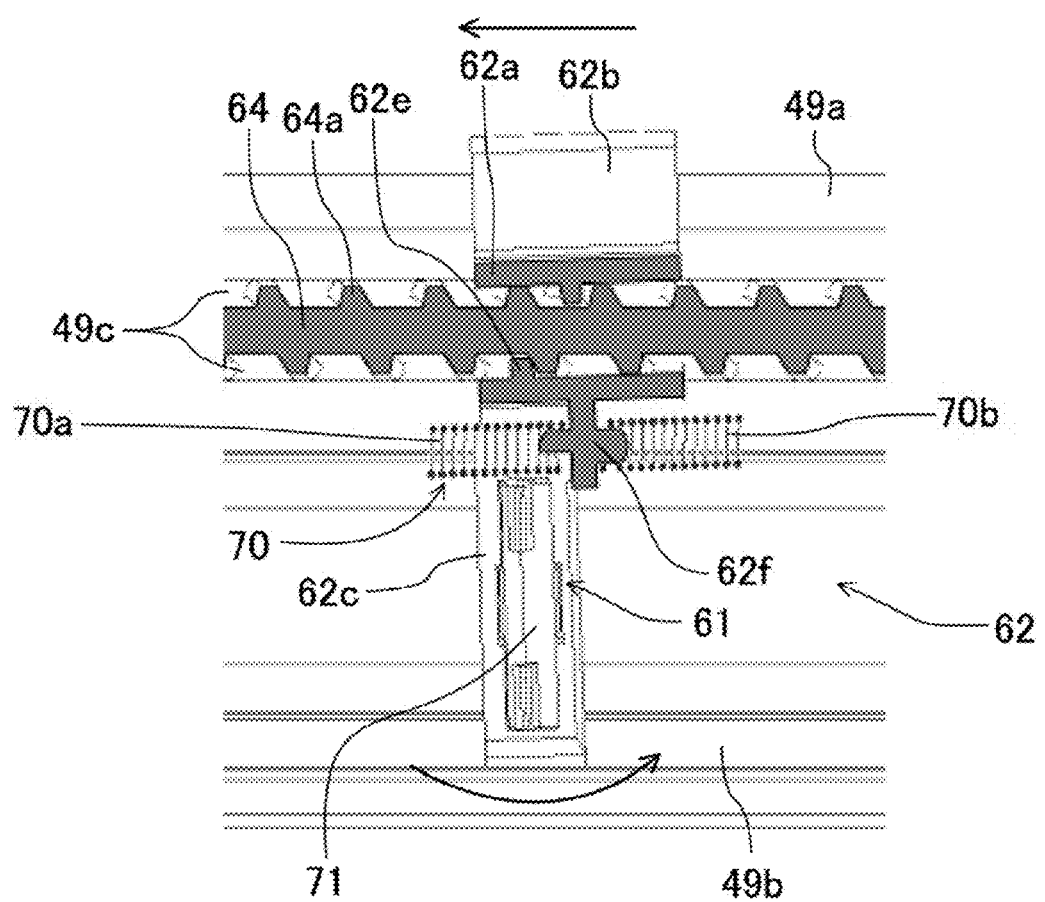
FIG. 21 is a transverse sectional view of a holding member viewed from a upper side, in which the holding member has been inclined frontward during movement along a reciprocal movement path.

FIG. 18 is a transverse sectional view of the holding member 62 viewed from a lower side, in which the holding member 62 has been inclined frontward during movement along the reciprocal movement path A. FIG. 21 is a transverse sectional view of the holding member 62 viewed from an upper side, in which the holding member has been inclined frontward during movement along the reciprocal movement path A. That is, in FIG. 18 and FIG. 21, when the screw shaft 64 rotates backward, the holding member 62 and the cleaning member 61 move along the screw shaft 64 toward the front moving end (the right side of FIG. 18 and the left side of FIG. 21) of the reciprocal movement path A, so that the blade 72 cleans the surface of the glass cover 43. In this state, the right arm part 62c of the holding member 62 is inclined to the rear moving end side (the left side of FIG. 18 and the right side of FIG. 21), so that the posture correction member 48 is pressed to the side surface of the groove 49d of the second rail parts 49c. By this pressing resistance, since the posture correction member 48 moves later than the movement of the holding member 62, the engagement protrusion 62d of the movement direction side (the right side of FIG. 18) of the holding member 62 relatively moves in the second concave portion 48c of the movement direction side (the right side of FIG. 18) of the holding member 62 by the delay operation to abut an end portion in the movement direction of the holding member 62 in the groove-like concave part 48a and the engagement protrusion 62d of the counter movement direction side (the left side of FIG. 18) of the holding member 62 relatively moves to the first concave portion 48b from the second concave portion 48c of the counter movement direction side (the left side of FIG. 18) of the holding member 62, so that the inclined posture of the holding member 62 is corrected in the direction perpendicular to the second rail parts 49c. FIG. 19 is a transverse sectional view of the posture of the holding member 62 viewed from a lower side, in which the posture of the holding member inclined frontward during movement along the reciprocal movement path A has been corrected. In this way, the holding member 62 and the cleaning member 61 are not inclined and stably move to the rear moving end (the right side of FIG. 18 and the left side of FIG. 21) of the reciprocal movement path A, so that the boss part 62a stops by abutting the front bearing plate 47. Consequently, there is no unwiped portion at the front side of the transparent cover 102. In this state, the screw thread 62e of the boss part 62a is detached from the screw thread 64a of the screw shaft 64; however, since the front spring part 70a of the spring 70 abuts the bearing plate 47 and is compressed, the boss part 62a is immediately and slightly pushed back rearward by the compression force of the front spring part 70a, so that the screw thread 62e of the boss part 62a is meshed with the screw thread 64a of the screw shaft 64 and then movement of the holding member 62 and the cleaning member 61 to the rear moving end of the reciprocal movement path A is prepared.

Figure 25:
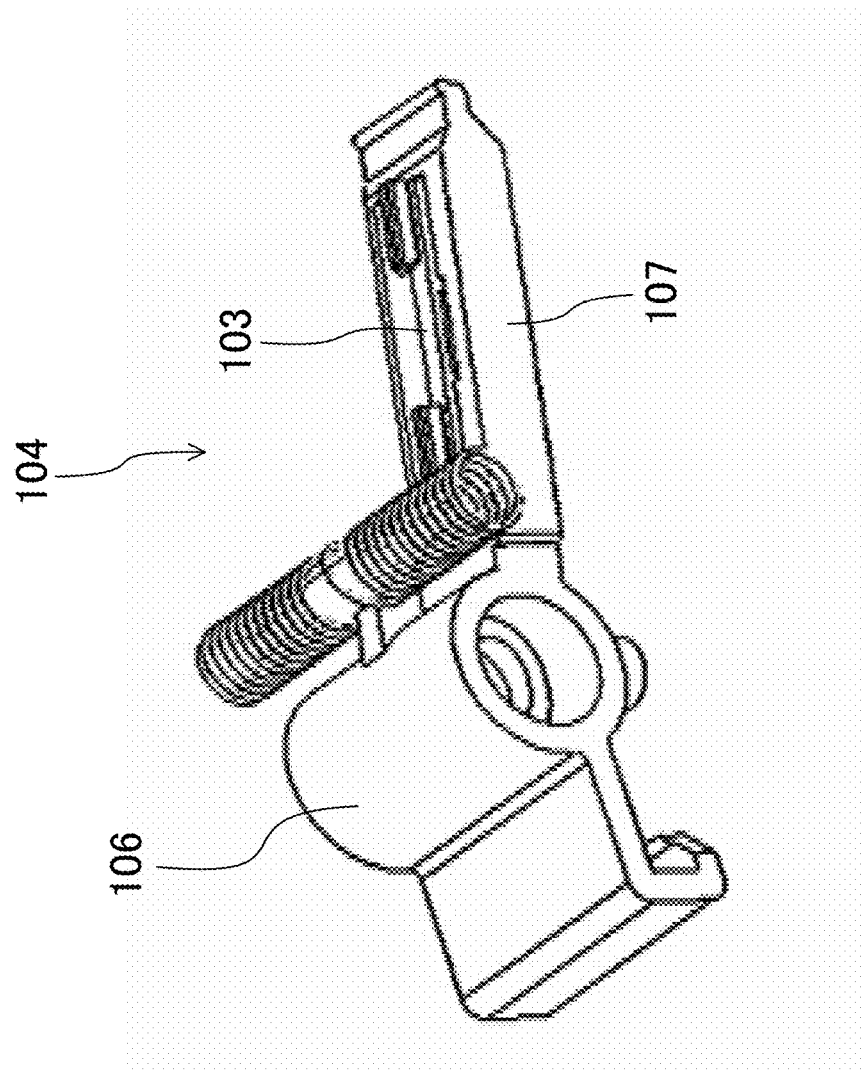
FIG. 25 is a perspective view of a holding member of a related art.
Figure 26:
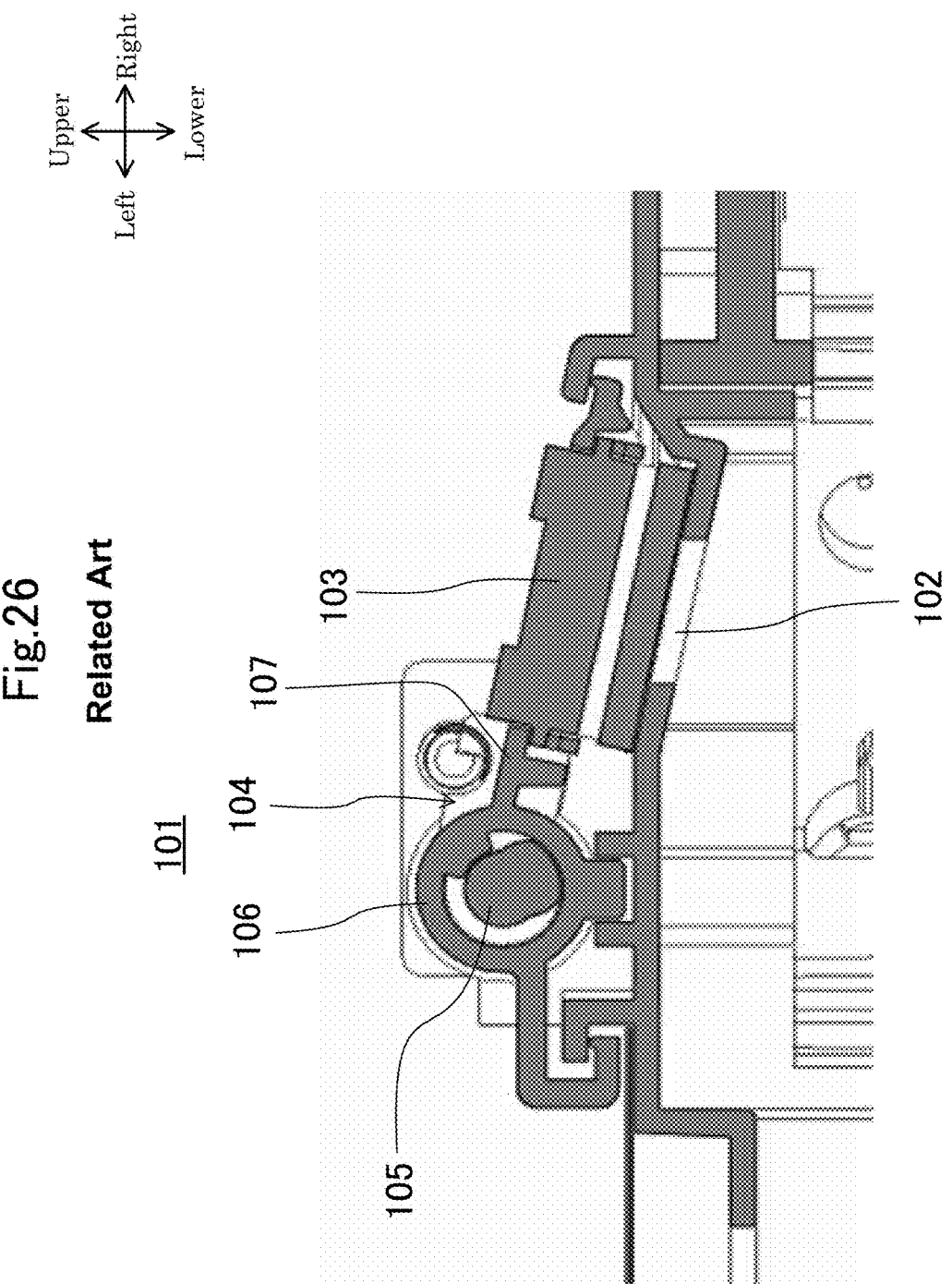
FIG. 26 is a view corresponding to FIG. 5, which illustrates a related art.

However, in the cleaning mechanism 101 as disclosed in the related art, as illustrated in FIG. 25 to FIG. 27, the holding member 104 has a cylindrical boss part 106 fitted to the screw shaft 105 and an arm part 107 extending from the boss part 106 in a direction perpendicular to the screw shaft 105, and the cleaning member 103 is simply held to the arm part 107. Therefore, as illustrated in FIG. 28, the cleaning member 103 is inclined by frictional resistance due to abutting the transparent cover 102 at the time of reciprocating motion.

In this state, even though the boss part 106 reaches both ends of the screw shaft 105, if the cleaning member 103 is inclined, an unwiped portion occurs in the transparent cover 102.

In this regard, in the present embodiment, the two engagement protrusions 62d of the boss part 62a are inserted into the groove-like concave part 48a of the posture correction member 48 such that the posture correction member 48 is mounted to the boss part 62a so as to be relatively movable in the movement direction of the holding member 62, and the posture correction member 48 is inserted into the groove 49d between the two second rail parts 49c so as to be movable. Then, when the holding member 62 moves, the posture correction member 48 is allowed to move later than the movement of the holding member 62. By this delay operation, the engagement protrusion 62d of the movement direction side of the holding member 62 is allowed to relatively move in the second concave portion 48c of the movement direction side of the holding member 62 and the engagement protrusion 62d of the counter movement direction side of the holding member 62 is allowed to relatively move to the first concave portion 48b from the second concave portion 48c of the counter movement direction side of the holding member 62, so that the inclined posture of the holding member 62 is corrected in the direction perpendicular to the second rail parts 49c.

As described above, in the present embodiment, since the inclination of the cleaning member 61 is corrected by the posture correction member 48, the cleaning member 61 is allowed to reciprocate with a stable posture with respect to the glass cover 43, so that it is possible to improve cleaning performance.

Another Embodiment

Figure 22:
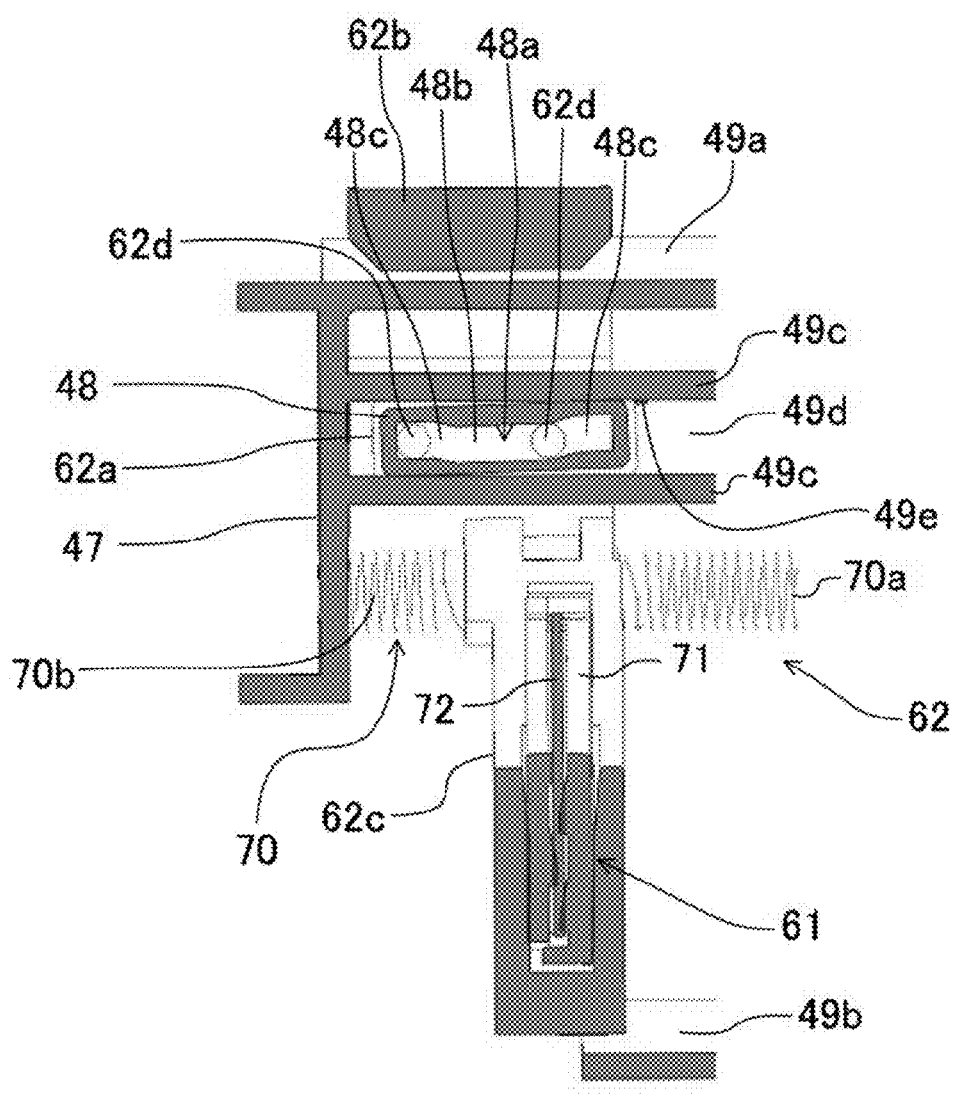
FIG. 22 is a transverse sectional view of a holding member viewed from a lower side, in which a boss part has abutted a rear bearing plate in another embodiment.
Figure 23:
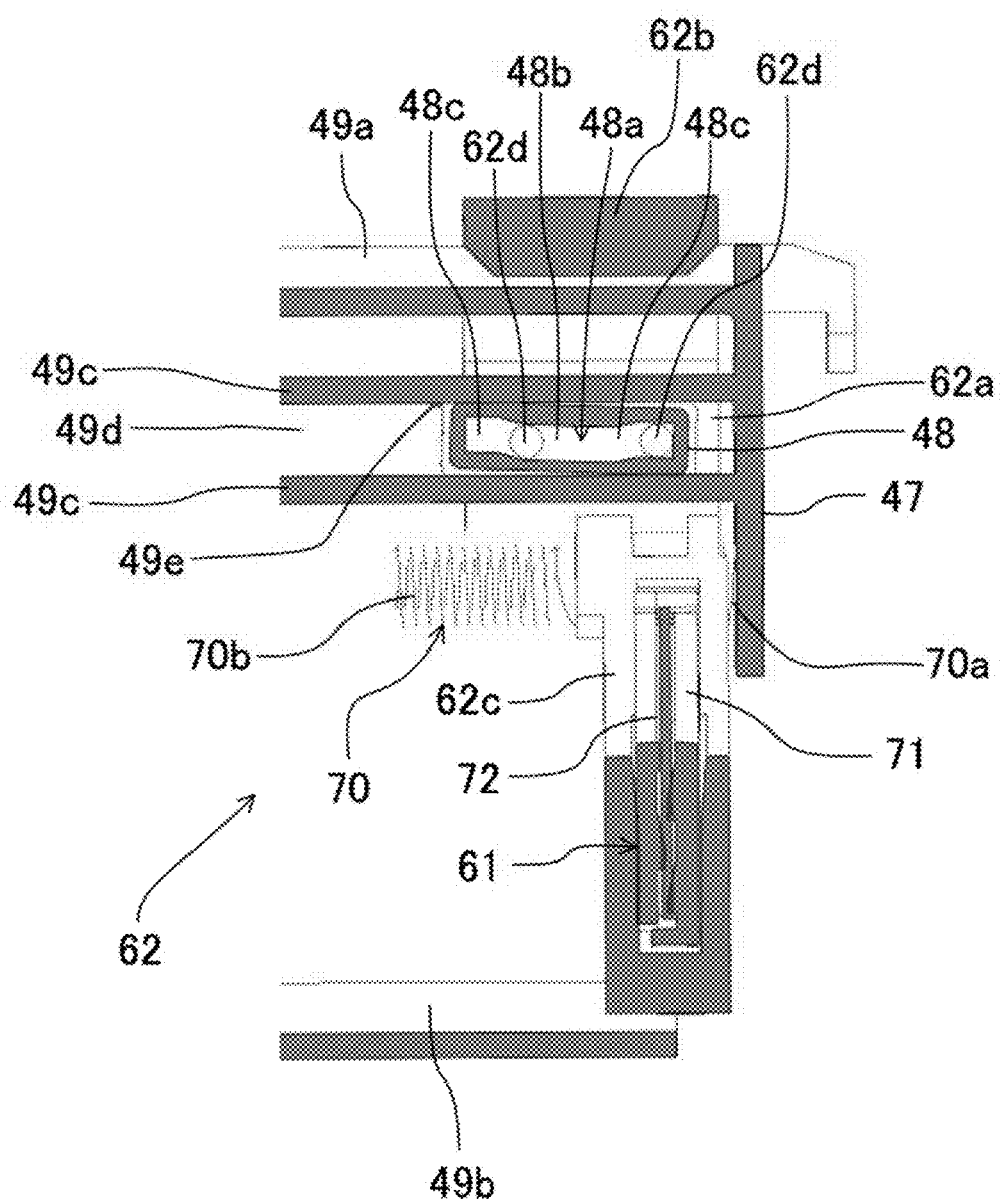
FIG. 23 is a transverse sectional view of a holding member viewed from a lower side, in which a boss part has abutted a front bearing plate in another embodiment.

FIG. 22 and FIG. 23 illustrate other embodiments. FIG. 22 is a transverse sectional view of the holding member 62 viewed from a lower side, in which the boss part 62a has abutted the rear bearing plate 47. FIG. 23 is a transverse sectional view of the holding member 62 viewed from a lower side, in which the boss part 62a has abutted the front bearing plate 47.

In this embodiment, from the inner surface (the side surface of the groove 49d) of the second rail part 49c of the left arm part 62b side, an abutting portion 49e protrudes near the bearing plates 47 serving as the front moving end and the rear moving end of the holding member 62.

In this way, when the holding member 62 moves from an end portion to an opposite end portion of the second rail part 49c, the posture correction member 48 abuts the abutting portion 49e, so that the posture correction member 48 can be allowed to reliably move later than the movement of the holding member and the inclination of the cleaning member 61 can be reliably corrected to reliably improve cleaning performance.

Further Another Embodiment

Figure 24:
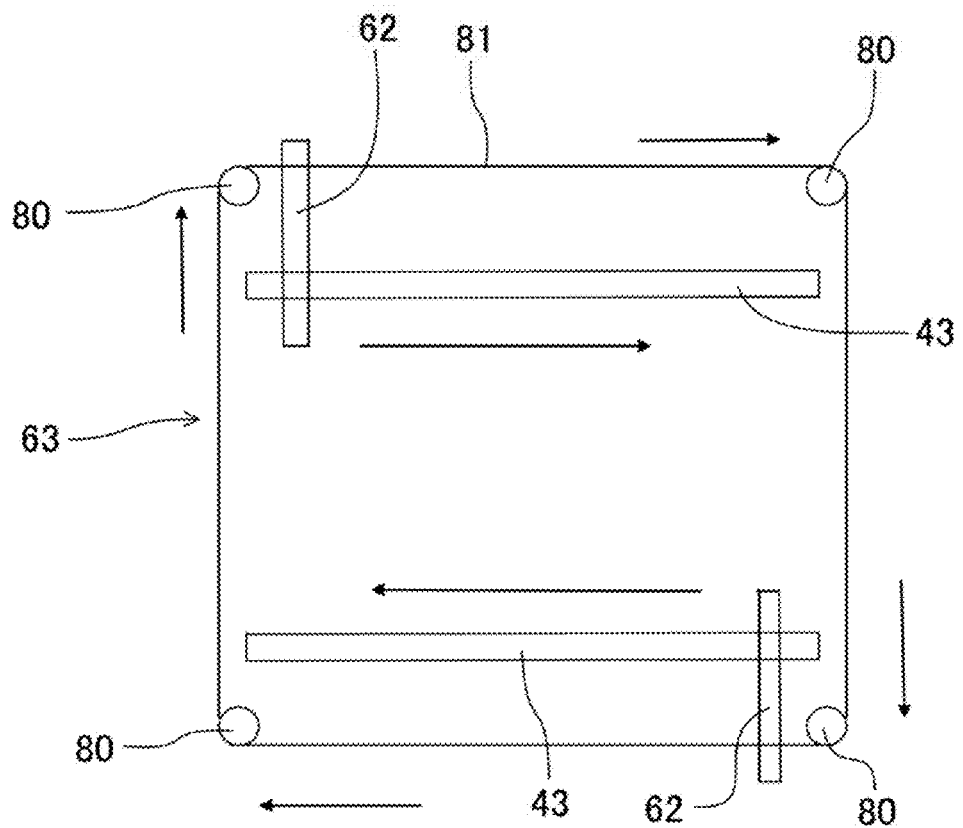
FIG. 24 is a plan view illustrating a cleaning mechanism of further another embodiment.

In the aforementioned embodiments, the screw mechanism having the screw shaft 64 is employed as the movement mechanism 63; however, it may be possible to employ a movement mechanism 63 that allows the holding member 62 to reciprocally move along the glass cover 43 by a wire mechanism in the front and rear direction. For example, as illustrated in FIG. 24, a wire 81 is wound around four pulleys 80 in an annular rectangular shape and the holding members 62 are respectively fixed to two side portions of the wire 81, which extend in the front and rear direction, so that the two holding members 62 are mutually reversed back to front.

What is claimed is:

1. An optical scanning device comprising:
a housing having light emitting ports extending in a predetermined direction;
a transparent cover that closes the light emitting ports;
a cleaning member that slidably contacts with a surface of the transparent cover to clean the surface of the transparent cover;
a holding member that holds the cleaning member; and
a movement mechanism that allows the holding member to reciprocally move along the transparent cover in the predetermined direction,
wherein the movement mechanism has two rail parts extending in a movement direction of the holding member,
wherein the holding member has a boss part that receives power from the movement mechanism and an arm part that extends from the boss part in a direction perpendicular to the movement direction of the holding member and holds the cleaning member,
wherein the boss part is mounted with a posture correction member relatively movable in the movement direction of the holding member, and
wherein the posture correction member is movably inserted into a groove between the two rail parts, and when the holding member moves, the posture correction member moves later than movement of the holding member, so that an inclined posture of the holding member is corrected by a delay operation in a direction perpendicular to the two rail parts.

2. The optical scanning device of claim 1, wherein the boss part has two engagement protrusions spaced apart from each other in the movement direction of the holding member, the posture correction member has a groove shaped concave part in which the engagement protrusions are relatively movable, the groove shaped concave part has a first concave portion in a middle of the movement direction of the holding member, and two second concave portions continued to both sides of the first concave portion and positioned in a direction further separated from the cleaning member than the first concave portion, and an engagement protrusion of a side of the movement direction of the holding member relatively moves in the second concave portion of the side of the movement direction of the holding member and an engagement protrusion of a counter movement direction side of the holding member relatively moves to the first concave portion from the second concave portion of the counter movement direction side of the holding member, so that the inclined posture of the holding member is corrected in the direction perpendicular to the two rail parts.

3. The optical scanning device of claim 2, wherein a separation amount between the first concave portion and the second concave portion is set as an amount by which the inclined posture of the holding member is corrected in the direction perpendicular to the two rail parts.

4. The optical scanning device of claim 1, wherein at least one of the two rail parts has an abutting portion that allows abutting of the posture correction member and allows the posture correction member to move later than the movement of the holding member when the holding member moves from an end portion to an opposite end portion of the two rail parts.

5. The optical scanning device of claim 1, wherein the movement mechanism includes a screw mechanism or a wire mechanism.

6. An image forming apparatus including the optical scanning device of claim 1.

* * * * *